United States Patent
Foo et al.

(10) Patent No.: US 11,245,442 B1
(45) Date of Patent: Feb. 8, 2022

(54) METHOD AND APPARATUS FOR COMMUNICATION USING MASSIVE-BEAM MIMO PHASED ARRAY

(71) Applicant: HUAWEI TECHNOLOGIES CO., LTD., Shenzhen (CN)

(72) Inventors: Senglee Foo, Ottawa (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/195,089

(22) Filed: Mar. 8, 2021

(51) Int. Cl.
| | |
|---|---|
| *H04B 7/0413* | (2017.01) |
| *H01Q 1/28* | (2006.01) |
| *H01Q 3/36* | (2006.01) |
| *H04B 7/06* | (2006.01) |

(52) U.S. Cl.
CPC .......... *H04B 7/0413* (2013.01); *H01Q 1/288* (2013.01); *H01Q 3/36* (2013.01); *H04B 7/0617* (2013.01)

(58) Field of Classification Search
CPC ...... H04B 7/0413; H04B 7/0617; H01Q 3/36; H01Q 1/288
USPC .......................................................... 375/267
See application file for complete search history.

(56) References Cited

U.S. PATENT DOCUMENTS

| | | | | |
|---|---|---|---|---|
| 2008/0278347 A1* | 11/2008 | Ho | ........................ | G07B 15/063 340/928 |
| 2009/0009392 A1* | 1/2009 | Jacomb-Hood | .......... | H01Q 3/24 342/374 |

OTHER PUBLICATIONS

Logan et al., "A new class of planar ultrawideband modular antenna arrays with improved bandwidth," IEEE Trans. On Antennas and Prop., vol. 66, No. 2, Feb. 2018, pp. 692-701.
J.J.H. Wang, "Traveling-wave antenna array (TWAA) with multioctave scan-gain-banwdith," 2016 IEEE International Symposium on Phased Array Systems and Technology (PAST), 2016.

* cited by examiner

*Primary Examiner* — Fitwi Y Hailegiorgis

(57) ABSTRACT

The present invention provides a long-distance (e.g. satellite-to-ground) wireless communication method and apparatus. Two-dimensional antenna arrays are operated pairwise to produce interleaved groupings of beams which are elongated in one direction and aligned in another direction. These groupings of beams can be provided using fixed analog beamforming arrays. An active beamformer can be used to form beams which are directed within each grouping of beams. Different ports of the analog beamforming arrays can be operated to produce beams in different groupings, or different bi-sector beams within a same grouping. A simplified parametric-based channel state information precoding operation using direction of arrival for MIMO processing is also provided.

18 Claims, 20 Drawing Sheets

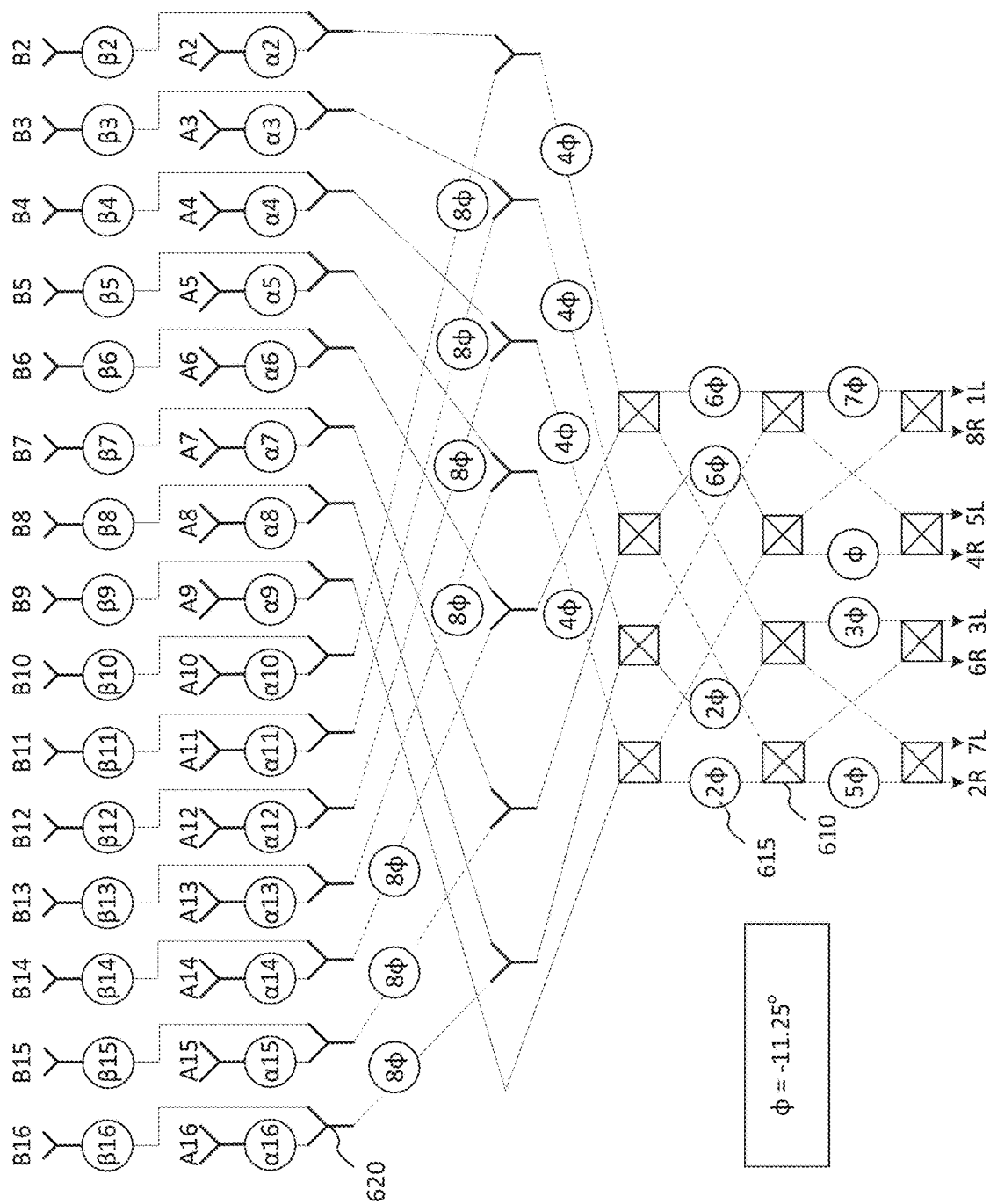

| Port | α (deg) | β (deg) |
|---|---|---|
| 1 | -11.25 | 180.0 |
| 2 | -101.25 | 90.00 |
| 3 | +22.50 | 168.75 |
| 4 | -112.50 | 78.75 |
| 5 | -33.75 | 157.5 |
| 6 | -123.75 | 67.50 |
| 7 | -45.00 | 146.25 |
| 8 | -135.0 | 56.25 |
| 9 | -56.25 | 135.0 |
| 10 | -146.25 | 45.00 |
| 11 | -67.50 | 123.75 |
| 12 | -157.5 | 33.75 |
| 13 | -78.75 | 112.5 |
| 14 | -168.75 | 22.50 |
| 15 | -90.00 | 101.25 |
| 16 | -180.0 | 11.25 |

Fig. 6b

| Port | α (deg) | β (deg) |
|---|---|---|
| 1 | -11.25 | 180.0 |
| 2 | -101.25 | 90.00 |
| 3 | -22.50 | 168.75 |
| 4 | -112.50 | 78.75 |
| 5 | -33.75 | 157.5 |
| 6 | -123.75 | 67.50 |
| 7 | -45.00 | 146.25 |
| 8 | -135.0 | 56.25 |
| 9 | -56.25 | 135.0 |
| 10 | -146.25 | 45.00 |
| 11 | -67.50 | 123.75 |
| 12 | -157.5 | 33.75 |
| 13 | -78.75 | 112.5 |
| 14 | -168.75 | 22.50 |
| 15 | -90.00 | 101.25 |
| 16 | -180.0 | 11.25 |

Fig. 7b

| Antenna | Beam L6 | | Beam L5 | | Beam L4 | | Beam L3 | | Beam L2 | | Beam L1 | |
|---|---|---|---|---|---|---|---|---|---|---|---|---|
| | Mag | Phase | Mag | Phase | Mag | Phase | Mag | Phase | Mag | Phase | Mag | Phase |
| B1←A1 | 0.00 | 0.00 | 0.00 | 0.00 | 0.00 | 0.00 | 0.00 | 0.00 | 0.00 | 0.00 | 0.00 | 0.00 |
| B2←A2 | 0.39 | 146.25 | 0.39 | 168.75 | 0.39 | 191.25 | 0.39 | 213.75 | 0.39 | 236.25 | 0.39 | 258.75 |
| B3←A3 | 0.77 | 22.50 | 0.77 | 67.50 | 0.77 | 112.50 | 0.77 | 157.50 | 0.77 | 202.50 | 0.77 | 247.50 |
| B4←A4 | 1.11 | 258.75 | 1.11 | -33.75 | 1.11 | 33.75 | 1.11 | 101.25 | 1.11 | 168.75 | 1.11 | 236.25 |
| B5←A5 | 1.41 | 135.00 | 1.41 | 225.00 | 1.41 | -45.00 | 1.41 | 45.00 | 1.41 | 135.00 | 1.41 | 225.00 |
| B6←A6 | 1.66 | 11.25 | 1.66 | 123.75 | 1.66 | 236.25 | 1.66 | -11.25 | 1.66 | 101.25 | 1.66 | 213.75 |
| B7←A7 | 1.85 | 247.50 | 1.85 | 22.50 | 1.85 | 157.50 | 1.85 | -67.50 | 1.85 | 67.50 | 1.85 | 202.50 |
| B8←A8 | 1.96 | 123.75 | 1.96 | -78.75 | 1.96 | 78.75 | 1.96 | 236.25 | 1.96 | 33.75 | 1.96 | 191.25 |
| B9←A9 | 2.00 | 0.00 | 2.00 | 180.00 | 2.00 | 0.00 | 2.00 | 180.00 | 2.00 | 0.00 | 2.00 | 180.00 |
| B10←A10 | 1.96 | 236.25 | 1.96 | 78.75 | 1.96 | -78.75 | 1.96 | 123.75 | 1.96 | -33.75 | 1.96 | 168.75 |
| B11←A11 | 1.85 | 112.50 | 1.85 | -22.50 | 1.85 | 202.50 | 1.85 | 67.50 | 1.85 | -67.50 | 1.85 | 157.50 |
| B12←A12 | 1.66 | -11.25 | 1.66 | 236.25 | 1.66 | 123.75 | 1.66 | 11.25 | 1.66 | 258.75 | 1.66 | 146.25 |
| B13←A13 | 1.41 | 225.00 | 1.41 | 135.00 | 1.41 | 45.00 | 1.41 | -45.00 | 1.41 | 225.00 | 1.41 | 135.00 |
| B14←A14 | 1.11 | 101.25 | 1.11 | 33.75 | 1.11 | -33.75 | 1.11 | 258.75 | 1.11 | 191.25 | 1.11 | 123.75 |
| B15←A15 | 0.77 | -22.50 | 0.77 | -67.50 | 0.77 | 247.50 | 0.77 | 202.50 | 0.77 | 157.50 | 0.77 | 112.50 |
| B16←A16 | 0.39 | 213.75 | 0.39 | 191.25 | 0.39 | 168.75 | 0.39 | 146.25 | 0.39 | 123.75 | 0.39 | 101.25 |

Fig. 8b

| Antenna | Beam R1 | | Beam R2 | | Beam R3 | | Beam R4 | | Beam R5 | | Beam R6 | |
|---|---|---|---|---|---|---|---|---|---|---|---|---|
| | Mag | Phase | Mag | Phase | Mag | Phase | Mag | Phase | Mag | Phase | Mag | Phase |
| B1→A1 | 0.00 | 0.00 | 0.00 | 0.00 | 0.00 | 0.00 | 0.00 | 0.00 | 0.00 | 0.00 | 0.00 | 0.00 |
| B2→A2 | 0.39 | -78.75 | 0.39 | -56.25 | 0.39 | -33.75 | 0.39 | -11.25 | 0.39 | 11.25 | 0.39 | 33.75 |
| B3→A3 | 0.77 | -67.50 | 0.77 | -22.50 | 0.77 | 22.50 | 0.77 | 67.50 | 0.77 | 112.50 | 0.77 | 157.50 |
| B4→A4 | 1.11 | -56.25 | 1.11 | 11.25 | 1.11 | 78.75 | 1.11 | 146.25 | 1.11 | 213.75 | 1.11 | -78.75 |
| B5→A5 | 1.41 | -45.00 | 1.41 | 45.00 | 1.41 | 135.00 | 1.41 | 225.00 | 1.41 | -45.00 | 1.41 | 45.00 |
| B6→A6 | 1.66 | -33.75 | 1.66 | 78.75 | 1.66 | 191.25 | 1.66 | -56.25 | 1.66 | 56.25 | 1.66 | 168.75 |
| B7→A7 | 1.85 | -22.50 | 1.85 | 112.50 | 1.85 | 247.50 | 1.85 | 22.50 | 1.85 | 157.50 | 1.85 | -67.50 |
| B8→A8 | 1.96 | -11.25 | 1.96 | 146.25 | 1.96 | -56.25 | 1.96 | 101.25 | 1.96 | 258.75 | 1.96 | 56.25 |
| B9→A9 | 2.00 | 0.00 | 2.00 | 180.00 | 2.00 | 0.00 | 2.00 | 180.00 | 2.00 | 0.00 | 2.00 | 180.00 |
| B10→A10 | 1.96 | 11.25 | 1.96 | 213.75 | 1.96 | 56.25 | 1.96 | 258.75 | 1.96 | 101.25 | 1.96 | -56.25 |
| B11→A11 | 1.85 | 22.50 | 1.85 | 247.50 | 1.85 | 112.50 | 1.85 | -22.50 | 1.85 | 202.50 | 1.85 | 67.50 |
| B12→A12 | 1.66 | 33.75 | 1.66 | -78.75 | 1.66 | 168.75 | 1.66 | 56.25 | 1.66 | -56.25 | 1.66 | 191.25 |
| B13→A13 | 1.41 | 45.00 | 1.41 | -45.00 | 1.41 | 225.00 | 1.41 | 135.00 | 1.41 | 45.00 | 1.41 | -45.00 |
| B14→A14 | 1.11 | 56.25 | 1.11 | -11.25 | 1.11 | -78.75 | 1.11 | 213.75 | 1.11 | 146.25 | 1.11 | 78.75 |
| B15→A15 | 0.77 | 67.50 | 0.77 | 22.50 | 0.77 | -22.50 | 0.77 | -67.50 | 0.77 | 247.50 | 0.77 | 202.50 |
| B16→A16 | 0.39 | 78.75 | 0.39 | 56.25 | 0.39 | 33.75 | 0.39 | 11.25 | 0.39 | -11.25 | 0.39 | -33.75 |

Fig. 8c

| Parameter | | Value |
|---|---|---|
| Satellite Rx Ant size | (AZ) (mm) | 320 |
| | (EL) (mm) | 10 |
| UE Tx Ant size (sq) | (mm) | 100 |
| Satellite altitude | (km) | 350 |
| Tx power | (W) | 0.2 |
| Rx antenna gain | (dBi) | 25 |
| Tx antenna gain | (dBi) | 29 |
| Modulation | | QPSK |
| BER | | 1e-05 |
| Min Eb/N0 | (dB) | 9.6 |
| Instantaneous bandwidth | (kHz) | 10 |
| Integration time | (msec) | 0.1 |
| Data rate | (Mbps) | 0.2 |

Fig. 15a

| Parameter | | Value |
|---|---|---|
| Satellite Rx Ant size | (AZ) (mm) | 320 |
| | (EL) (mm) | 320 |
| UE Tx Ant size (sq) | (mm) | 100 |
| Satellite altitude | (km) | 350 |
| Tx power | (W) | 0.2 |
| Rx antenna gain | (dBi) | 40 |
| Tx antenna gain | (dBi) | 29 |
| Modulation | | QAM-128 |
| BER | | 1e-05 |
| Min Eb/N0 | (dB) | 19.75 |
| Total bandwidth | (GHz) | 5 |
| Total data rate | (Gbps) | 32.6 |

Fig. 15b

METHOD AND APPARATUS FOR COMMUNICATION USING MASSIVE-BEAM MIMO PHASED ARRAY

CROSS-REFERENCE TO RELATED APPLICATIONS

This is the first application filed for this invention.

FIELD OF THE INVENTION

The present invention pertains in general to long-distance wireless communications, for example between terrestrial devices and satellites such as low-earth orbit (LEO) satellites, and in particular to MIMO phased antenna arrays and associated methods and apparatus, for example mounted on such satellites.

BACKGROUND

Various low-orbit satellite constellations are being planned or launched to support diverse applications, such as improved global connectivity, high-speed and secure communications, and global internet access. Of particular interest are high throughput satellite (HTS) systems, which are capable of delivering significantly high data rates compared to a conventional satellite service. These systems conventionally uses multiple spot beams, steerable toward targets, to improve data capacity with high-gain transmit/receive antennas, which allows better frequency reuse. However, conventional approaches for producing these high-gain steerable beams require large, complex and expensive phased antenna arrays. Therefore, there is a cost and physical limit to the large phased array approach.

Recently, there has been development in high-data-rate cellular communications (between terrestrial devices) employing large phased arrays and using precoding processing. Such developments involve technologies such as massive multi-input, multi-output (MIMO) communications. Using this method, a ground station can produce multiple steerable and independent high-gain beams using a large number of antenna elements (electromagnetic radiators). The current development of massive MIMO is well suited for high-capacity ground-based cellular systems in which transmitters and receivers are relatively close together.

One of the critical components of current massive MIMO systems is the use of pilot signals, which are required for complex signal processing for each given target device. Pilot signals are communicated from a transmitter to a receiver, the receiver provides feedback to the transmitter, thus supporting channel estimation which is important for proper MIMO configuration. For terrestrial communications, with target devices confined within a cell of relatively small size (e.g. several kilometers), a relatively successful approach using pilot signals has been developed. However, for space-to-ground communications or networks over significantly larger distances, this same approach likely does not have sufficient signal strength to achieve the required processing performance. In addition, the propagation delays involved over larger distances, relative to channel coherence times, and other factors particular to satellite networks such as high relative satellite speeds, make the use of such pilot signals problematic. In addition, antenna arrays specifically adapted for use over long distances are subject to improvement.

Therefore there is a need to provide a communication method and apparatus that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for communication using massive-beam MIMO phased arrays, for example mounted on a satellite such as a LEO satellite. While the present invention is described primarily with respect to a satellite implementation, it should be noted that embodiments of the invention can be incorporated into other communication devices, such as terrestrial, aerial, orbital, or space-based devices. Various aspects of the invention are described below. It should also be noted that embodiments of the present invention may be provided using synergistic combinations of multiple aspects of the invention, as described herein. For example, embodiments of the present invention can include plural antenna arrays, plural beamformer arrays, and an active beamformer, where the plural beamformer arrays produce narrow, interleaved beam groupings and the active beamformer is used to direct beams using beams of a given grouping. In some embodiments, a simplified CSI operation can also be employed in combination with the above.

Embodiments of the present invention provide for a multiple antenna (e.g. MIMO or massive MIMO) method and apparatus which incorporates both analog and digital precoding (e.g. in relation to beamforming). This makes the method and apparatus more suitable for long distance communication, for example with application to LEO, high-throughput satellite (HTS) communication. A simplified channel state information (CSI) processing approach can be used, which can facilitate simpler and quicker processing compared to a conventional massive MIMO phased array approach.

According to some embodiments, a communication apparatus is provided which includes one, two, or more sets of antenna arrays. Each set of antenna arrays can be a pair of antenna arrays. The antenna arrays may be in close proximity with inter-element spacing of less than or equal to half of an operating wavelength. Each one of each set of antenna arrays is configured and operated to produce multiple groupings of beams. Each grouping of beams may, in combination, have a cross section which takes on an elongated (e.g. elliptical) shape. This elongated shape can be significantly narrower than it is long. The shape can be elongated in the main direction of travel of the communication device (e.g. the orbital direction of the satellite). Different groupings of beams, of a given antenna array, are spaced apart from one another, and the groupings from different antenna arrays of the same set (e.g. pair) are interleaved with one another. Each set of antenna arrays is thereby configured to produce a plurality of beam groupings which may be substantially contiguous, and which have the property that adjacent beam groupings are produced by different antenna arrays in the same set of antenna arrays. This property may apply to all pairs of adjacent beam groupings.

According to some embodiments, a bi-sector beam-space massive MIMO phased array communication apparatus is provided. The communication device includes a two-dimensional phased antenna array, for example having N sets of N antenna elements each, for a total of $N^2$ elements. Multiple panels each having such a phased antenna array may be provided. For ease of exposition, the array can be described as having N rows and N columns. N can be equal to 8 or 16, for example. In addition, a plurality of beamformer networks are provided and coupled to the array elements. The beamformer networks collectively form part of a beamformer array. Each beamformer network can be implemented using analog radiofrequency (RF) circuitry and can be operated in a fixed configuration. Each beamformer network can be configured to produce N orthogonal beams, different ones of which are directed in different (e.g. azimuthal) directions. A subset M<N of such beams can be selected and used for communication. Sets of two or more antenna arrays (as described above) can be operated together to produce multiple substantially orthogonal elongated beam groupings. Multiple sets of antenna arrays can be operated together, using a further active beamformer. Pairs or multiple antenna arrays can be operated together to produce smaller tracking beams by combining beams from a given grouping, or beams from multiple co-directed groupings. The tracking beams are steerable in a given (e.g. elevation) direction. In various embodiments, beam steering and tracking along a major axis of the elongated beams can be implemented using linear massive MIMO processing.

In some embodiments, the beamformer array includes N beamformer networks as well as a plurality (e.g. N/2 rows) of hybrid couplers, where N is the number of rows of antenna elements in the array. Each beamformer network can be a Butler matrix or similar beamformer. In such embodiments, each beamformer network can have N beam ports and N antenna ports which are operatively coupled to a respective row of antenna elements of the phased array. The N beamformer networks can be implemented in parallel, each coupled to a different row of antenna elements. Pairs of beamformer networks can be coupled together using rows of hybrid couplers, and operated together to produce N forward directed beams and N backward directed beams in a bi-sectoral manner.

In some embodiments, the beamformer array includes N/2 customized beamformer networks, where N is the number of rows of antenna elements in the array. Each beamformer network is coupled to two (e.g. adjacent) rows of antenna elements. Each beamformer network includes a plurality of beam ports which is less than the total number of antenna elements (and corresponding antenna ports) in the two rows. For example, the number of beam ports can be approximately one quarter the total number of antenna ports. The beamformer networks of a given array can all be similar or substantially identical. However two different configurations of beamformer networks (e.g. with different phase shifter settings) can be provided and used in two different complementary antenna arrays, in order to produce different sets of beams to be interleaved together. Hybrid couplers configured and operated to form forward directed and backward directed (bi-sector) beams can also be employed in such embodiments.

According to some embodiments, a communication apparatus configured to produce (at least) two orthogonal and independently steerable bi-sector beams is provided. The beams are bi-sector in the sense that one of the beams is directed toward a front portion of a given region, and another of the beams is directed toward a back portion of the same given region. The two beams may overlap in the sense that the front and back portions may overlap. In some embodiments, the bi-sector beams are produced using the hybrid couplers as described above. The hybrid couplers can be 90° hybrid couplers. Arbitrary amplitude and phase tapers can also be employed in the beamformers. The two bi-sector beams may have forward and backward pre-tilt angles of 30°, respectively, at an operating frequency. The pre-tilt angles are relative to an axis which is perpendicular to a plane of the array. This presents an effective half-wavelength element spacing. In some embodiments, each of the two bi-sector beams is steerable from 0° to 45° with at least 85% radiation efficiency. Coverage in directions angularly close to the axis which is perpendicular to the plane of the array, within a half power beamwidth (HPBW) can be achieved using a combination of the two beams.

According to some embodiments, there is provided a communication apparatus which includes two independent N×2N (e.g. N=8) orthogonal beamforming networks, having low sidelobes and low beam coupling factor (BCF).

According to some embodiments, there is provided a simplified parametric-based channel state information (CSI) precoder, and associated method, which uses direction of arrival of signals from target devices for massive MIMO processing.

According to embodiments of the present invention, there is provided a wireless communication apparatus. The apparatus includes first and second separate two-dimensional arrays, each having multiple antenna elements, and first and second beamformer arrays (e.g. fixed, analog arrays). The first beamformer array is operatively coupled to the first antenna array and is configured to produce a first plurality of beams by operating the first antenna array as a phased array. The first plurality of beams are separated into multiple spaced-apart groupings of beams, for example being spaced-apart in the azimuthal direction. Similarly, the second beamformer array is operatively coupled to the second antenna array and is configured produce a second plurality of beams by operating the second antenna array as a second phased array. The second plurality of beams is separated into a multiple additional spaced-apart groupings of beams which are interleaved with the multiple spaced-apart groupings of beams from the first array. Each grouping of beams typically includes a respective plurality of overlapping beams, which can be operated together for further beamforming. In various embodiments, each beamformer array includes a plurality of beamformer networks arranged in parallel. In such embodiments, the beamformer array is configured to provide a set of beam ports. Each of the beam ports is operatively coupled, via one of the beamformer networks or via a coupled pair of the beamformer networks, to a pair of adjacent rows of antenna elements.

In some embodiments, each of the beamformer networks is coupled to a different respective row of antenna elements and each beamformer array includes one or more rows of hybrid couplers. Each row of hybrid couplers is connected to a respective pair of the plurality of beamformer networks, and wherein said beam ports are ports of the hybrid couplers. In some further embodiments, different hybrid couplers operate beams in different ones of the groupings of beams, and each hybrid coupler comprises a pair of ports. Each one of the pair of ports operates different bi-sector beams in a same one of the groupings of beams.

In some embodiments, each of the beamformer networks is coupled to a different respective pair of adjacent rows of said antenna elements and includes a subset of the set of beam ports. A number of beam ports in the subset is less than a number of antenna elements in said pair of adjacent rows. In further embodiments, each of the beamformer networks includes a plurality of hybrid couplers arranged in a series-parallel configuration, a plurality of power splitters each coupled to a pair of antenna elements comprising one antenna element in each of said pair of adjacent rows, and a plurality of phase shifters, at least some of the phase shifters disposed between said power splitters and said antenna elements.

In some embodiments, particularly in combination with the case where each beamformer network is coupled to a different respective pair of adjacent rows of said antenna elements, the multiple antenna elements and the multiple additional elements, respectively, are arranged with an inter-element spacing of less than or equal to half an operating wavelength, to provide a closely spaced array.

In some embodiments, each grouping of beams is composed of individual beams which collectively have a respective combined cross section which is elongated in a first (e.g. elevation) direction, and the different groupings of beams are aligned alongside one another in a second (e.g. azimuthal) direction which is perpendicular to the first direction. In some further embodiments, the apparatus is carried on a satellite which moves relative to Earth, and the first direction is oriented so that each respective combined cross section is a portion of Earth's surface which is elongated parallel to a direction of travel of the satellite. In some embodiments, each grouping of beams is a bi-sector grouping of beams including one, two or more front beams and one, two or more back beams. The front beams collectively provide a first part of said combined cross section. The first part is located toward a first end of the combined cross section. The back beams collectively provide a second part of the combined cross section. The second part is located toward a second end of the combined cross section. The first end and the second end are opposite one another along the first direction, and the first part and the second part may be (partially) overlapping, or alternatively non-overlapping. The front beams may be orthogonal to the back beams. The front beams may be directed at a different angle relative to the back beams.

In some embodiments, an active beamformer is provided, for example as part of an apparatus as described above. The active beamformer may be operatively coupled to the first beamformer array. The active beamformer is configured to generate, using digital precoding, one or more tracking beams at least in part by combining multiple beams belonging to one of the groupings of beams, of the multiple spaced-apart groupings of beams. In some further embodiments, each grouping of beams is composed of individual beams which collectively have a respective combined cross section which is elongated in a first direction, and the active beamformer is configured to steer the tracking beams in the first direction. In some further embodiments, the apparatus includes, in addition to the first and second arrays, one or more additional antenna arrays and one or more additional beamformer arrays each operatively coupled to a respective one of the additional antenna arrays. Each of the additional beamformer arrays is configured to produce additional copies of the first plurality of beams by operating the respective one of the additional antenna arrays as a further phased array. Each of these additional copies overlaps with the first plurality of beams. In such embodiments, the active beamformer is further operatively coupled to each of the additional beamformer arrays, and the active beamformer is configured to generate said one or more tracking beams further by combining said multiple beams with one or more additional beams belonging to said additional copies of the first plurality of beams.

In some embodiments, each grouping of beams is composed of individual beams which collectively have a respective combined cross section which is elongated in a first direction. The different groupings of beams are aligned alongside one another in a second direction which is perpendicular to the first direction. Furthermore, the rows of antenna elements extend parallel to one another in the second direction and are spaced apart from one another in the first direction.

In some embodiments, a channel state estimator is provided, for example (but not necessarily) as part of an apparatus as described above. The channel state estimator is configured to estimate a primarily line-of-sight wireless communication channel state between the host apparatus and a remote wireless communication device. The estimate is based on a direction of arrival of a signal transmitted by the remote wireless communication device. The estimate is further based on a geometry of antenna array (e.g. the first antenna array and the second antenna array), using statistical channel state information and a parametric channel model. In some embodiments, when the channel state estimator forms part of the above-described apparatus, the groupings of beams are orthogonal to one another, and estimating the wireless communication channel state includes performing a plurality of separate linear precoding operations.

According to embodiments of the present invention, there is provided a system which includes two or more devices, including one or more apparatuses as described above, one or more target devices, or a combination thereof.

According to embodiments of the present invention, there is provided a method for wireless communication, which involves operating the apparatus or system as described above or elsewhere herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 6a illustrates a 8×16 orthogonal analog beam former for an embodiment of phased Array A.

FIG. 6b is a table showing phase shift values for various phase shifters of FIG. 6a.

FIG. 7b is a table showing phase shift values for various phase shifters of FIG. 7a.

FIG. 8b is a table showing effective excitation amplitude and phase tapers for a 8×16 beamforming network, according to the embodiment of FIG. 8a, where beams are labelled L1-L6.

FIG. 8c is a table showing effective excitation amplitude and phase tapers for a 8×16 beamforming network, according to an embodiment of FIG. 8a, where beams are labelled R1-R6.

FIG. 15a is a table showing m-MIMO performance data for a pilot signal using 2 array panels of 320 mm sq., according to an embodiment.

FIG. 15b is a table showing actual m-MIMO performance data for a pilot signal using 2 array panels of 320 mm sq., where m-MIMO processing has a wider bandwidth and a higher number of array panels, such as 2×5, according to an embodiment.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention provide for methods and apparatus in relation to a beam-space massive MIMO phased antenna array. The phased array can have high gain and can be steerable. Massive MIMO technology has not previously been implemented for satellite communications. This is due for example to long transmission distances (and large delays) and high transmission losses. Such factors make it difficult to obtain CSI feedback for use in channel estimation, which is typically used in MIMO systems. Embodiments of the present invention involve use of large phased array using massive-MIMO processing for long-distance communication using a combination of analog and digital precoding. The potentially results in stronger pilot signals for CSI processing and significantly simplified CSI processing. The simplification can involve reducing a two-dimensional digital precoding operation to a combination of separate, simpler linear processing operations. This can be particularly well-suited to application in low-orbit high-throughput satellite (HTS) communications.

Figure 1A:
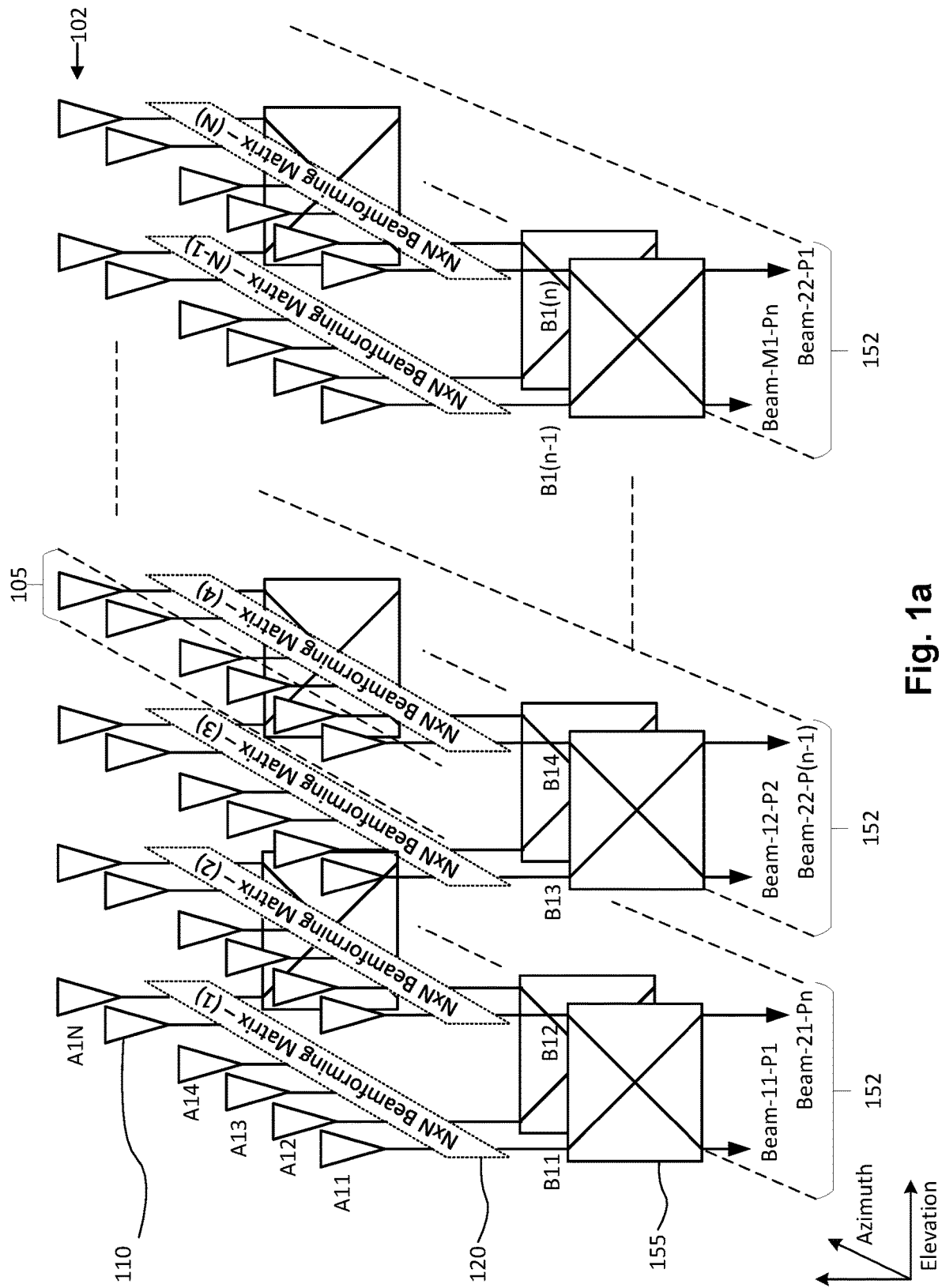
FIG. 1a illustrates a steerable bi-sector (N×N) beam-space massive-MIMO array, according to an embodiment.

FIG. 1a illustrates a single antenna array 102 provided in accordance with an embodiment of the present invention. This can be referred to as an M steerable bi-sector (N×N) beam-space massive-MIMO array. The illustrated antenna array is applicable for example in a single-polarized application, for example using single polarized antennas (radiators). However, it should be understood that the present invention can be readily expanded to a dual-polarized application by using dual-polarized radiators. The antenna array is a two-dimensional array having multiple elements 110, for example arranged in N rows (e.g. row 105) of N radiators each. For purposes of exposition and in various embodiments of the present invention, each row (vertically oriented in FIG. 1A) extends in the azimuthal direction, and rows are parallel to one another, and are spaced apart from one another in the elevation direction. However, it should be understood that other directions and orientations may be employed. The antenna array may be a planar array or the array may be disposed on a curved surface. In operation, a beam-space of M (out of a possible N) orthogonal beams (or beam groupings) can be formed, each of the M beams being directed differently in the azimuthal direction. In the presently illustrated embodiment, these beams or beam groupings are produced in part using a plurality of beamformer networks 120 each having N antenna ports and N beam ports (referred to as N×N beamformers). Although N beam ports are available which implies N beams, in various embodiments only M<N beams are used, with the number M being selected for example based on scan-angle requirements in the azimuth direction.

According to various embodiments, the inter-element spacing of the antenna array 102, as well as the inter-element spacing of the other antenna arrays of the apparatus, is less than or equal to half of an operating wavelength of the antenna array. As such, the antenna array may be a closely spaced array. The array can also be configured as a non-resonant array. Such embodiments are particularly useful for example when implementing the beamformer networks of FIGS. 6a and 7a.

Inter-element spacing of less than or equal to half a wavelength will typically introduce high mutual coupling between antenna elements. A tightly-coupled phased array is designed and operated while accounting for such high mutual coupling. An example is a tightly coupled dipole array (TCDA) which has recently been introduced in the literature. See for example J. T. Logan, R. W. Kindt, M. Y. Lee, M. N. Vouvakis, "A new class of planar ultrawideband modular antenna arrays with improved bandwidth," IEEE Trans. On Antennas and Prop., vol. 66, no. 2, February 2018, pp. 692-701, and J. J. H. Wang, "Traveling-wave antenna array (TWAA) with multioctave scan-gain-bandwidth," 2016 IEEE International Symposium on Phased Array Systems and Technology (PAST), 2016.

A typical phased array is designed using independently resonating radiators. These radiators resonate in certain frequency ranges, or are narrow-band resonators. In a tightly-coupled phased array, the entire array operates in a substantially unitary manner. However, each radiator does not necessarily operate as a resonator in an operating frequency range.

Figure 7A:
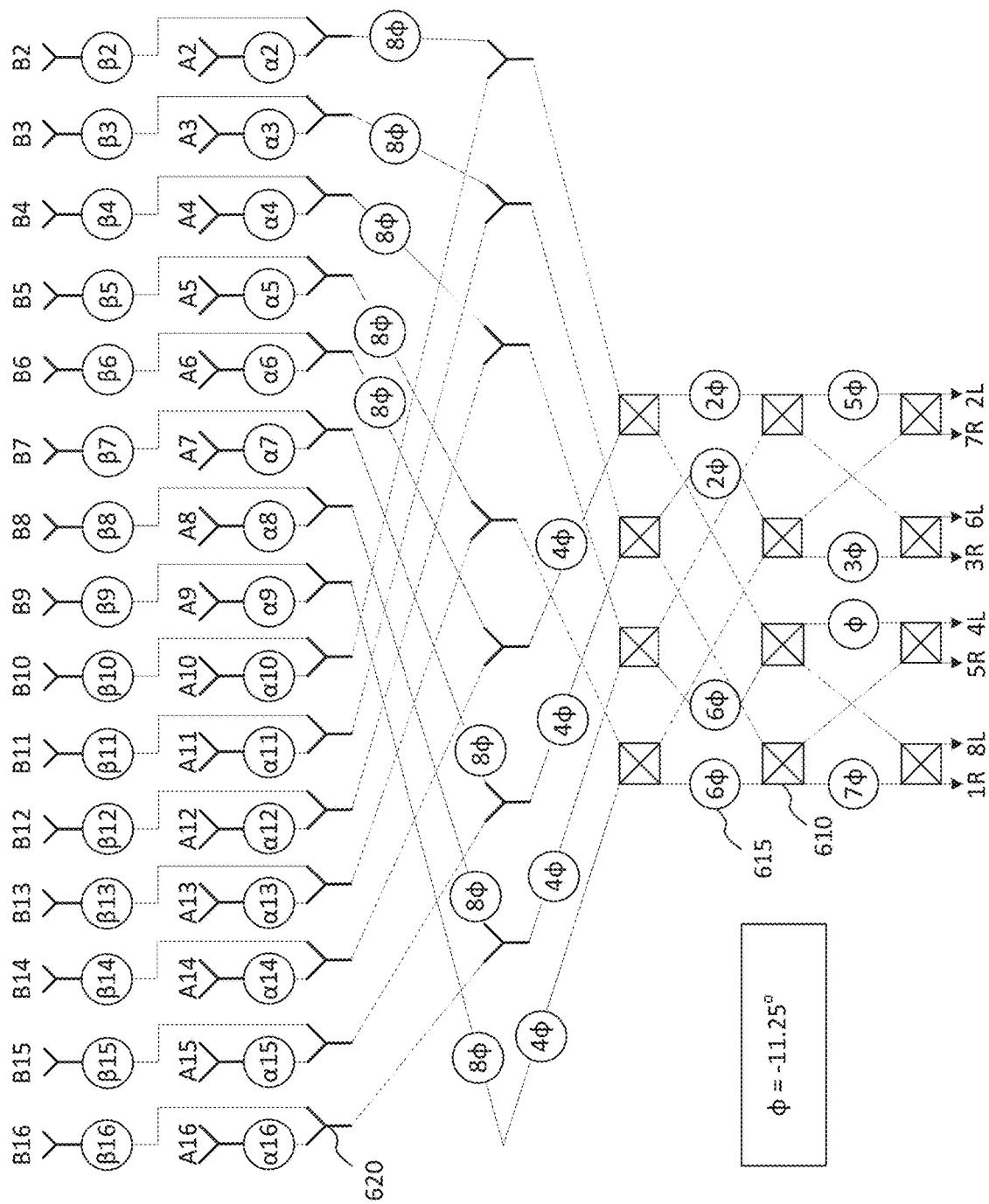
FIG. 7a illustrates a 8×16 orthogonal analog beam former for an embodiment of phased array B.

In more detail, each beamformer network 120 is coupled to a different corresponding set (e.g. row or pair of closely spaced rows) of N antenna elements 110 of the same antenna array 102. The beamformer networks may be Butler matrices, or structures similar to Butler matrices. In an alternative embodiment, beamformer networks as described with respect to FIGS. 6a and 7a are used. In such cases, hybrid couplers 155 may also be included and used to form bi-sector beams for example in the elevation direction. Such embodiments are described in more detail elsewhere herein.

The beamformer networks are typically constructed using analog components and fixed in behaviour, for example with the phase shifts being substantially non-controllable, or at least only controllable in a calibration capacity. The beamformer networks can employ power splitter/combiners, phase shifters, and hybrid couplers, for example. Because the components of the beamformer network are fixed, i.e. non-controllable, beamsteering is typically accomplished using a further, active beamformer, which is described elsewhere herein.

The beam ports of the beamformer networks are operatively coupled to rows 152 of hybrid (e.g. 3 dB) couplers 155, which may be 90° hybrid couplers, also referred to as quadrature hybrids, or simply hybrids. For clarity, in FIG. 1A, each row of hybrids of equal numbers of antenna ports is shown extending in the azimuth direction (the same direction as the linear array) although this is simply for ease of illustration. The hybrid couplers are four-port directional couplers providing equal power splitting/combining between input and output ports. In some embodiments, a 90° hybrid coupler operates with a resultant 90° phase shift between output ports. As shown, each hybrid has a first pair of ports (inputs) facing toward the antennas and beamformer networks, and a second pair of ports (outputs) facing away from the beamformer networks. The second pairs of ports are typically connected to digital circuitries for further processing. Inputs of each row of hybrids are connected to the beam ports of two different beamformer networks. In various embodiments, the two different beamformer networks that are connected to the same row of hybrids are adjacent to one another, for example in the sense that they are coupled to adjacent rows of antenna elements in the array.

Accordingly, multiple beamformer networks are arranged in parallel and coupled to different respective sets of antenna elements. Rows 152 of hybrid couplers are connected to respective (adjacent) pairs of beamformer networks. Different beam ports of the beamformer networks 120, and thus different ports of the hybrid couplers 155, operate beams in different groupings of beams. Different beam ports of the same hybrid coupler operate different bi-sector beams in a same one of the groupings of beams, due to such different ports directing RF energy in different ways to or from pairs of the beamformer networks.

The plural beamformer networks 120 coupled to a same antenna array, along with the hybrid couplers 155 connected to the plural beamformer networks, form parts of an overall beamformer array. Each antenna array can be operatively coupled to its own corresponding beamformer array.

The beamformer array, which is operatively coupled to the antenna array 102, is configured to produce a first plurality of beams by operating the antenna array 102 as a phased array. The beams can be transmit beams, receive beams, or a combination thereof. As will be described in more detail below, the first plurality of beams are separated into multiple spaced-apart groupings of beams. That is, neighbouring groupings may be separated by gaps of a given width. Each grouping of beams includes its own respective plurality of overlapping beams.

A second antenna array and second beamformer array are provided and configured similarly, but not identically, to the antenna array and beamformer array as described above. In particular, the second beamformer array is operatively coupled to a second antenna array. The second antenna array includes multiple additional antenna elements and is typically separate from the first antenna array. For example the first and second antenna arrays can be spaced apart. The first and second arrays may be substantially identical in terms of element design and layout. The second beamformer array is configured produce a second plurality of beams by operating the second antenna array as a second phased array. The second plurality of beams is separated into a multiple additional spaced-apart groupings of beams. Notably, the multiple additional spaced-apart groupings of beams are interleaved with the multiple spaced-apart groupings of beams of the first antenna array and first beamformer. In various embodiments, two groupings of beams are interleaved. However, theoretically three or more groupings of beams can be interleaved, provided that the beamformer structure is configured to accommodate this configuration. Using multiple separate arrays may facilitate beam orthogonality.

Additional antenna arrays and corresponding additional beamformer arrays, each operatively coupled to a respective one of the additional antenna arrays, can also be provided. Each of the additional beamformer arrays is configured to produce additional copies of the first plurality of beams or the second plurality of beams. This is achieved by operating an additional array as a further phased array in a same manner as described above with respect to the first and second beamformer arrays and corresponding arrays. The additional arrays can be substantially identical to the arrays as already described above. Each of the additional copies overlaps with (e.g. coincides with or is co-directed with) the first plurality of beams or the second plurality of beams. As will be explained elsewhere herein, multiple beamformer arrays, for example the first beamformer array and one, two or more additional beamformer arrays, having overlapping/coincident copies of beams, can be operated together using an active beamformer in order to produce steerable tracking beams. These steerable tracking beams can be more tightly focused and controllable, so as to direct RF energy for communication with particular target devices.

In various embodiments, each grouping of beams is composed of individual beams which collectively have a respective combined cross section which is elongated in a first direction, which may be the elevation direction. The different groupings of beams are aligned alongside one another in a second direction, which may be perpendicular to the first direction, and which may be the azimuthal direction. In some embodiments, for example when the apparatus is carried on a satellite which moves relative to Earth, the first direction is oriented so that each respective combined cross section is a portion of Earth's surface, this cross section being elongated parallel to a direction of orbital travel of the satellite.

The groupings of beams of the second beamformer array may be wide enough to substantially fill the gaps between the groupings of beams of the first beamformer array. Accordingly, in various embodiments, the beams of the first and second beamformer arrays (i.e. the multiple groupings of beams and the multiple additional groupings of beams) may together form a substantially contiguous overall set of beams which are aligned alongside one another.

Figure 11:
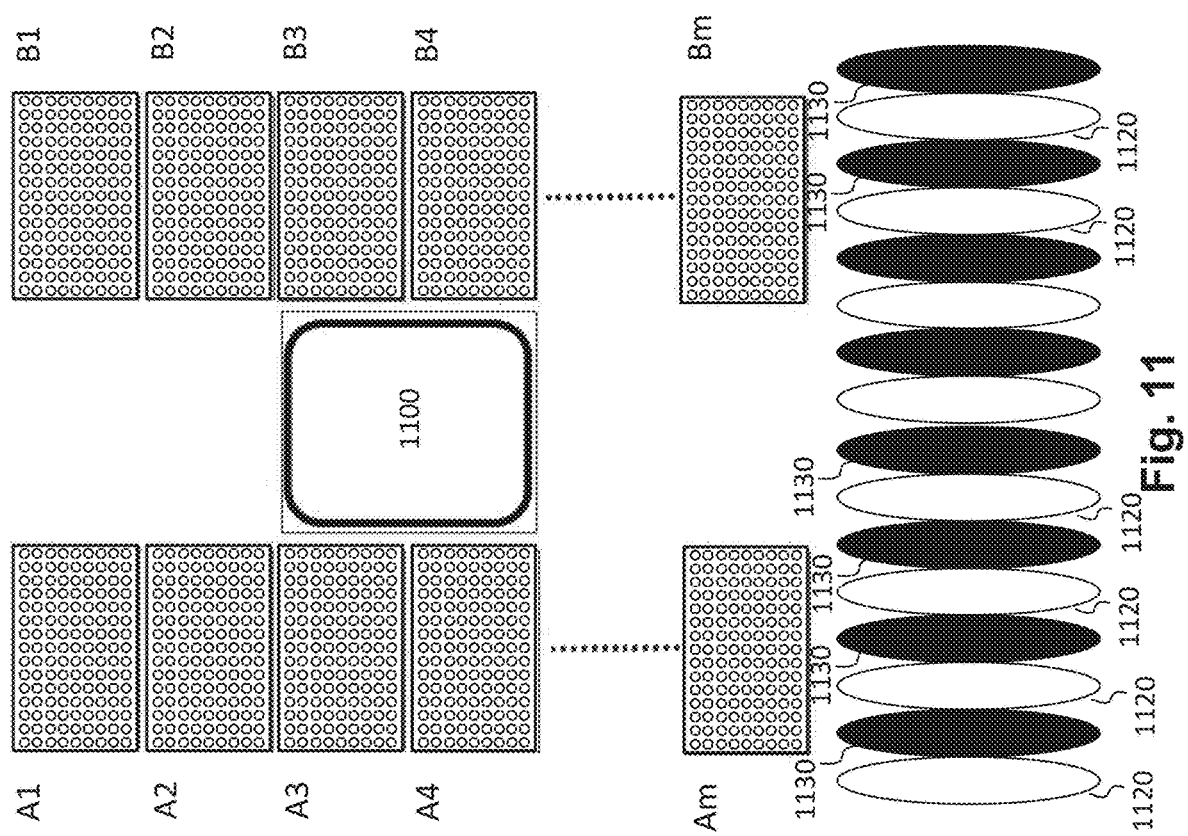
FIG. 11 illustrates a dual-panel orthogonal beam-space massive-MIMO phased array, according to an embodiment.

FIG. 11 shows an example of two interleaved sets of multiple groupings of beams which are elongated in a first (e.g. elevation) direction and which are aligned alongside one another in a second (e.g. azimuthal) direction. The elongated cross section can be an ellipse, as shown, or another shape. Each ellipse 1120, 1130 corresponds to a grouping of beams. The unshaded ellipses 1120 correspond to the multiple spaced-apart groupings of beams of one of the arrays, e.g. array A1, while the shaded ellipses 1120 correspond to the multiple spaced-apart groupings of beams of another, complementary one of the arrays, e.g. array B1. Arrays A2 to Am may also produce groupings of beams which correspond to the unshaded ellipses 1120 and Arrays A2 to Am may also produce groupings of beams which correspond to the shaded ellipses 1130.

In various embodiments, each grouping of beams includes at least two different bi-sector beams. A first one of the bi-sector beams is directed toward a first (e.g. front) portion of the combined cross section (e.g. toward the bottom of an ellipse 1120 or 1130 of FIG. 11), and a second one of the bi-sector beams is directed toward a second (e.g. back) portion of the combined cross section (e.g. toward the top of an ellipse 1120 or 1130 of FIG. 11). The bi-sector beams are thus differently directed but are typically overlapping. Each grouping can include multiple copies of each of the bi-sector beams.

Accordingly, each grouping of beams may be a bi-sector grouping of beams having one, two or more front beams and one, two or more back beams. The front beams can be substantially identical to one another, and the back beams can be substantially identical to one another. The front beams collectively provide a first part of the combined cross section of a grouping. This first part is toward a first end of the combined cross section. Likewise, the back beams collectively provide a second part of said combined cross section. This second part is toward a second end of the combined cross section. The first end and the second end are opposite one another along the first direction, and the first part and the second part may be overlapping. Alternatively the first and second parts may be non-overlapping, however this may affect beamforming options when it is desired to form a beam (e.g. using the active beamformer) directed toward a central part of the combined cross section. Because the beams all originate from the substantially the same location (as seen from a distant target), directing the beams in different manners and toward different locations is performed by differently angling the beams. For example, the front beams are directed at a different angle relative to the back beams.

In various embodiments, different beams are orthogonal. For example the front beams may be orthogonal to the back beams. Additionally or alternatively, different groupings of beams may be orthogonal to one another. Orthogonality is used to describe spatial orthogonality in beamforming, for example as follows. For advanced communications using multibeam transmission, excitations of the phased array need to satisfy the following conditions for optimum performance:

$$\sum_i L_i * R_i = \delta, \delta \to 0, i = 1 \ldots N \tag{1}$$

$$BCF = \min\left(k \int E_R(\theta, \varphi) \cdot E_L(\theta, \varphi) d\Omega\right), \tag{2}$$

where $k = \left[\int \|E_R(\theta, \varphi)\| \cdot \|E_L(\theta, \varphi)\| d\Omega\right]^{-1}$.

Equation (1) above provides for port orthogonality between the two beams, where $L_i$ and $R_i$ represent the two complex beam excitations. The summation is zero when the two ports are perfectly orthogonal. Typically, it is desirable to keep this effect to below −20 dB. Equation (2) above represents the beam coupling factor (BCF) between two beams. It further constraints the complex excitations such that coupling through radiation patterns, $E_R$ and $E_L$, to minimum. Typically, the BCF needs to be below −15 dB.

Figure 1B:
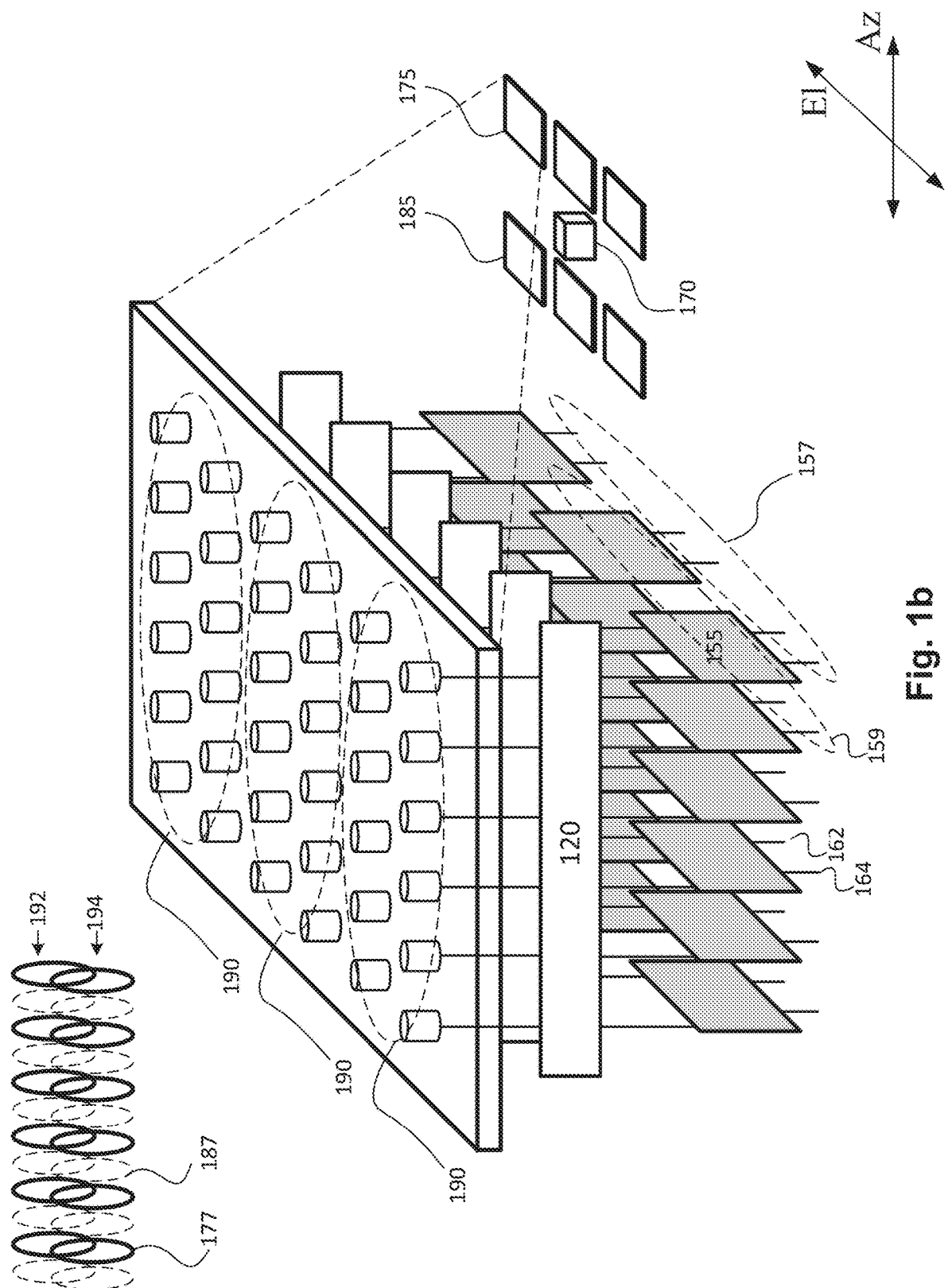
FIG. 1b illustrates a steerable bi-sector (N×N) beam-space massive-MIMO array, according to another embodiment.

FIG. 1b illustrates an embodiment similar to FIG. 1a. An apparatus 170 has six array panels operatively coupled thereto, corresponding to M=3 pairs of panels. One such panel 175 is shown in greater detail. The panel 175 produces multiple spaced-apart groupings of beams, for example grouping 177. Another panel 185 produces multiple additional spaced-apart groupings of beams, for example grouping 187 (dashed lines) which are interleaved with the groupings 177.

Digital beamforming is performed on rows of beam ports, for example row 157, in order to perform active beamforming in the elevation direction. There are three groupings (pairs of rows) of antenna elements 190, each of which produces one grouping of beams, including a front beam 192 and a back beam 194. The groupings overlap with one another. Active beamforming in the elevation direction is performed at least in part using a combination of these three groupings of beams. Beamforming can also involve additional overlapping groupings of beams from other panels. Different rows of beam ports, for example rows 157 and 159, can be used to produce differently directed beams in the azimuthal direction. Different ports of a same hybrid, for example ports 162, 164, can be used to produce different ones of the front and back beams 192, 194, of a same grouping of beams.

Figure 2:
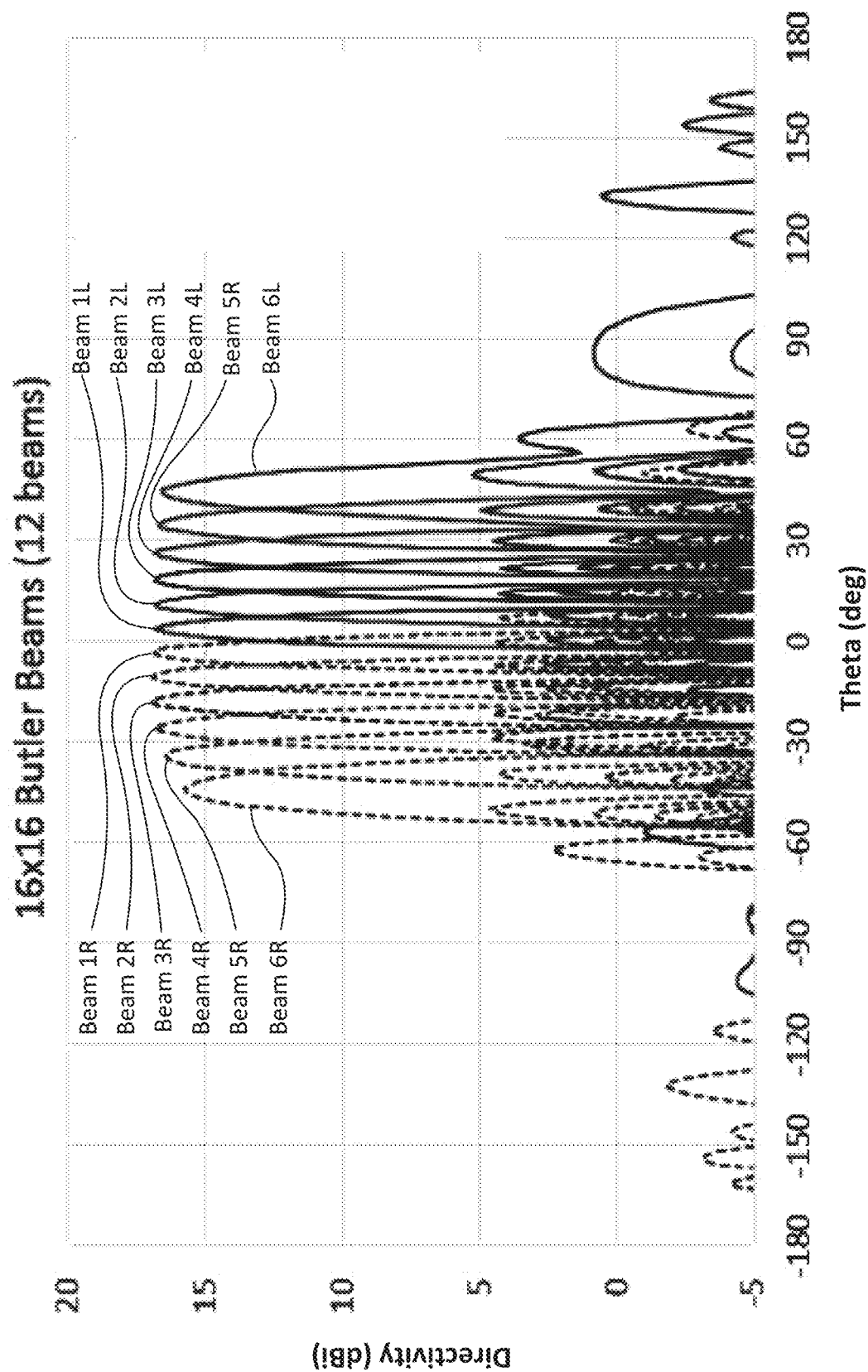
FIG. 2 is a graph showing typical beam patterns of orthogonal beams produced by a Butler matrix, according to an embodiment.

Typically, an N×N beamformer such as a Butler matrix produces N orthogonal beam patterns with a relatively high side lobe, which can be −13 dB. FIG. 2 shows typical beam patterns of orthogonal beams as can be produced by a 16×16 Butler matrix, as an example. The N orthogonal beam patterns can have high side lobes. Beams are labeled 1R to 6R for beams angled progressively outward to the right, and 1L to 6L for beams angled progressively outward to the left.

Although resulting beams of such an N×N beamformer are typically orthogonal to each other, the beam-space patterns can have a high beam coupling factor (BCF). This can increase the interference between neighboring beams, and reduce the overall capacity of a system. In FIG. 2, the beams are orthogonal with a −4 dB crossover. However sidelobe levels (SLLs) are only −13 dB. Consequently, beam coupling factor amongst all beams is greater than −10 dB, and the correlation coefficient is greater than 0.3. This problem can be solved by superimposing two or three of the N×N orthogonal beams to form a set of new orthogonal beams. In this case, the sidelobe levels can be reduced to below −15 dB, which is more acceptable in terms of a pattern's BCF.

Figure 3:
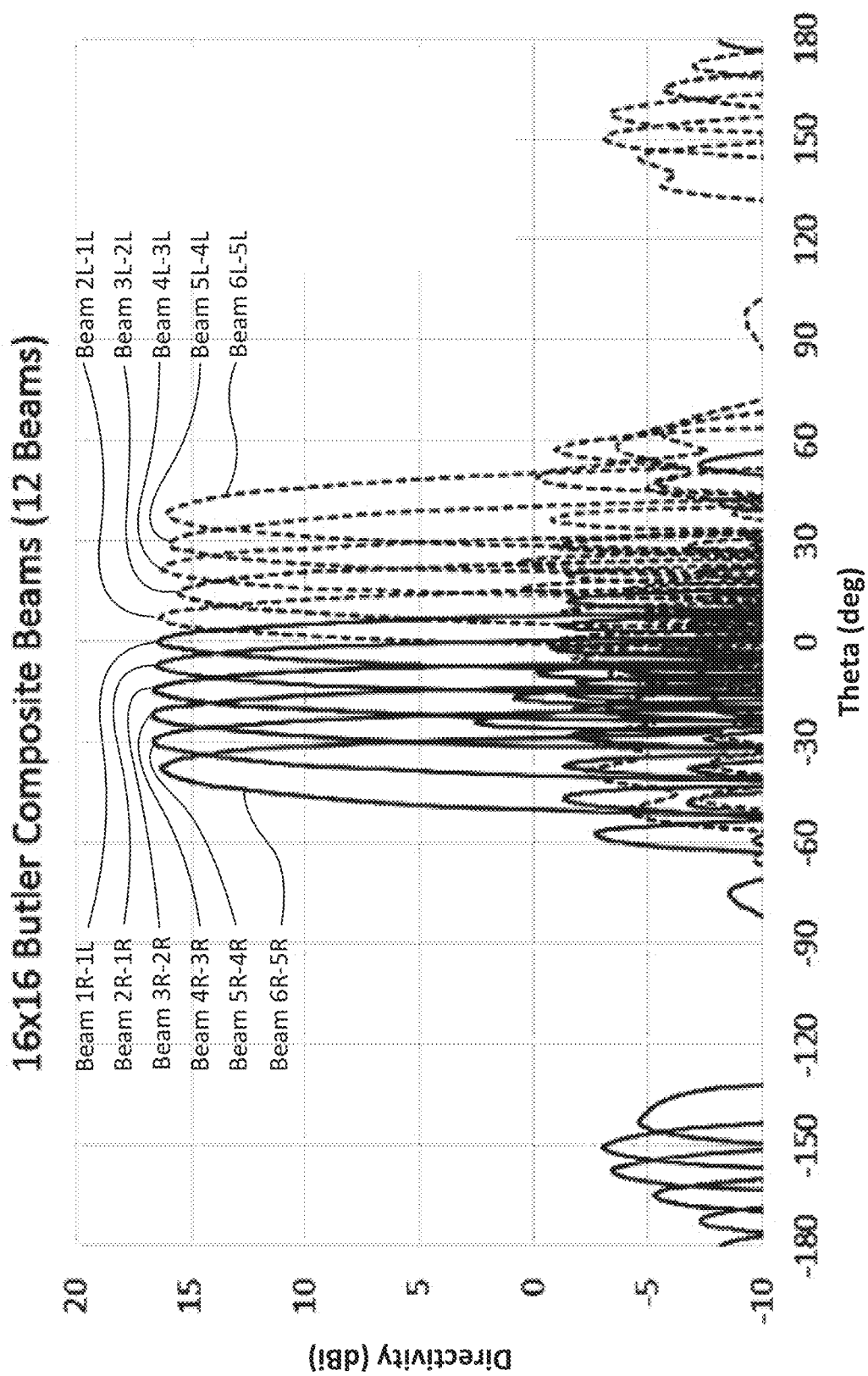
FIG. 3 is a graph showing beam patterns of composite beams by superimposing N×N Butler orthogonal beams, according to an embodiment.

FIG. 3 shows beam patterns of composite beams formed by superimposing N×N orthogonal beams produced by a Butler matrix beamforming network. Only a limited number of the beams are shown, these beams falling within an angular range of interest. The beams of FIG. 3 can be achieved by superimposing pairs of beams of FIG. 2. For example the leftmost two beams 6R and 5R in FIG. 2 can be superimposed to form the leftmost beam 6R-5R in FIG. 3. The composite beams are labeled in the form such as 1R-1L to 6L-5L to indicate what combination of the beams of FIG. 2 each composite beam is formed from. The composite beams can be formed by combining multiple beam outputs with proper amplitudes and phases using RF combining circuitry. In FIG. 3, the composite beams SLL can be less than −15 dB and the correlation coefficient can be less than 0.3, with crossover less than 2 dB.

Such composite beams however, are only orthogonal with beams that are more than one beam-space apart. Accordingly, in embodiments of the present invention, two separate and/or independent phased arrays, which can be referred to as Array A and Array B, can be used to cover an entire beam space in the azimuth direction, with each array producing beam patterns of alternate beams (as in FIG. 11). That is, Array A can produce a first spaced-apart grouping of beams, and Array B can produce a second spaced-apart grouping of beams which is interleaved with the first spaced-apart grouping of beams. Array A can correspond to a first antenna array and a first beamformer array, and Array B can correspond go a second antenna array and a second beamformer array.

Figure 4:
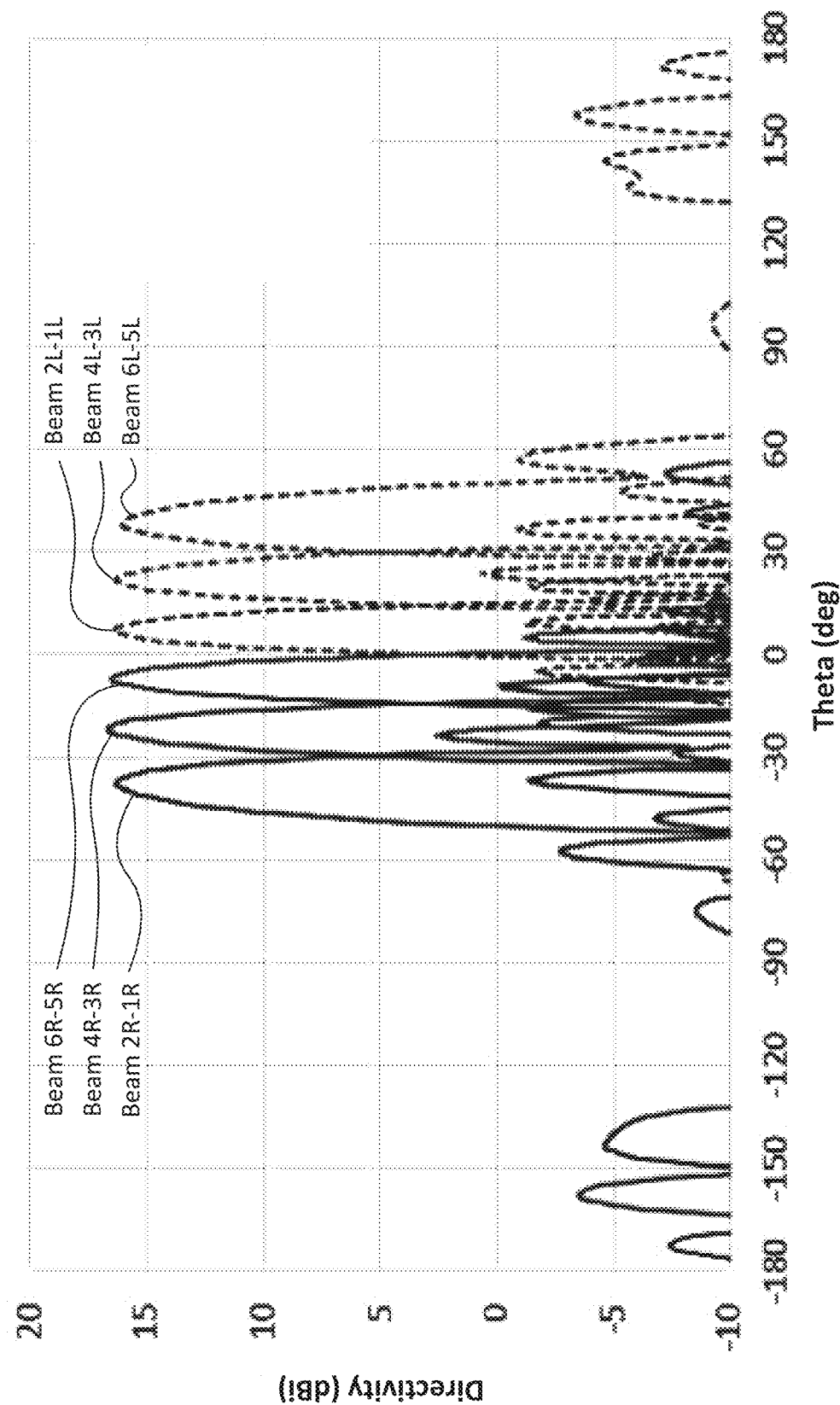
FIG. 4 is a graph showing the beam patterns of a first orthogonal composite beam-space phased array, here referred to as Array A, according to an embodiment.

FIG. 4 is a graph showing the beam patterns of a first orthogonal composite beam-space phased array, here referred to as Array A, according to an embodiment. The composite beams are the same as the corresponding beams of FIG. 3, however only the beams that are actually formed by Array A are shown.

Figure 5:
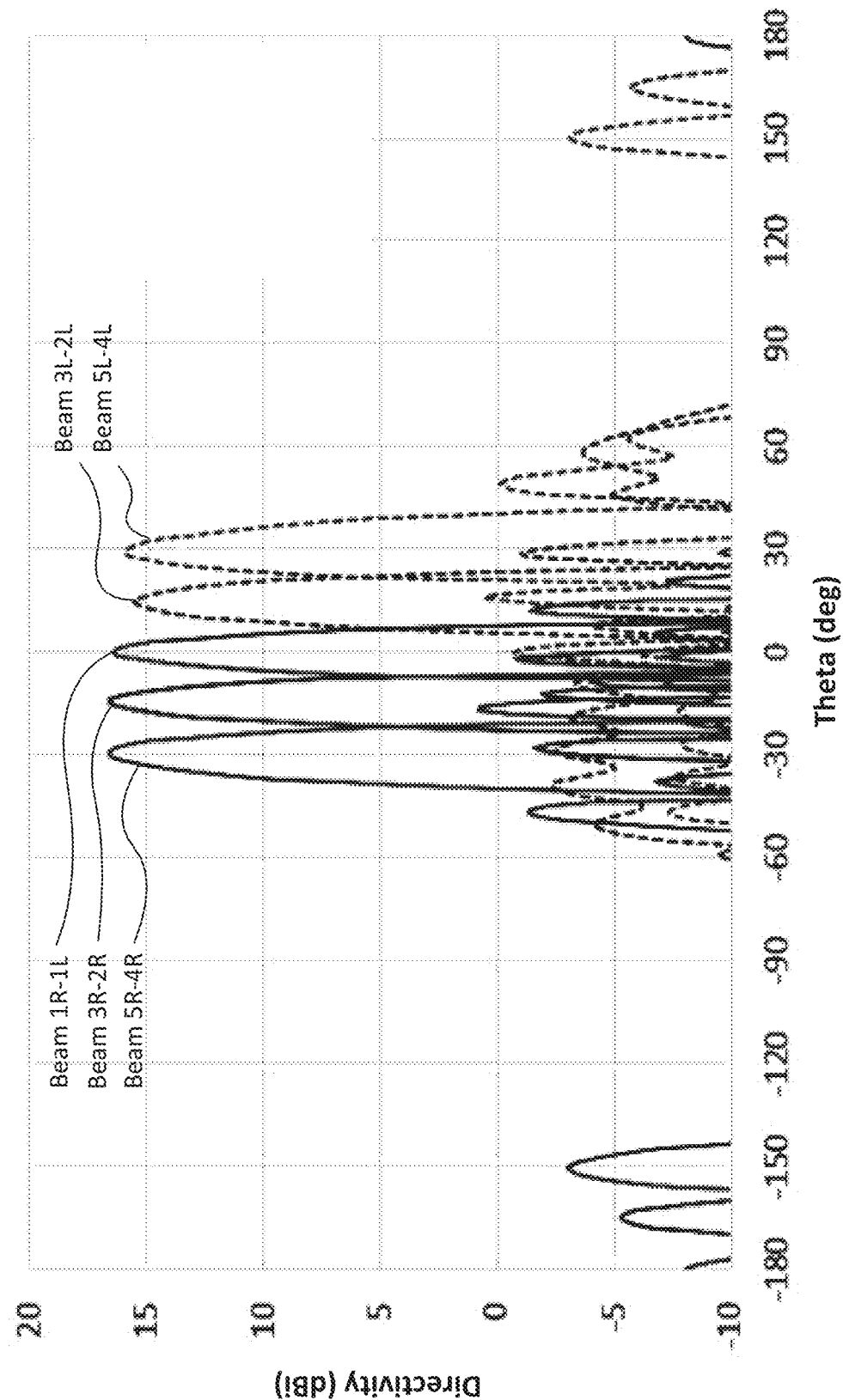
FIG. 5 is a graph showing the beam patterns of a second orthogonal composite beam-space phased array, here referred to as Array B, according to an embodiment.

FIG. 5 is a graph showing the beam patterns of a second orthogonal composite beam-space phased array, here referred to as Array B, according to an embodiment. The composite beams are the same as the corresponding beams of FIG. 3, however only the beams that are actually formed by Array B are shown.

Together, Array A and Array B can form a complete set of 16×16 orthogonal beam-space patterns, having a low BCF in the azimuthal direction. Unlike a conventional massive-MIMO array, the output at each transmission/reception (Tx/Rx) port of an array according to an embodiment, can have a significantly higher signal strength, due to the high-gain beam patterns. As a result, an array can handle a significantly larger range, because each pilot signal from a beam port can have a much better signal-to-noise ratio (SNR) at individual beam ports.

FIG. 6a illustrates a 8×16 orthogonal analog beamformer network for an embodiment of phased array A. There are 8 beam ports along the bottom, labeled from 1L to 8R. There are two subsets of 15 antennas each along the top, labeled A2 to B16 (A1 and B1 are not necessary in this implementation). The antenna elements A2 to A16 can correspond to elements in a first row of an antenna array, and the antenna elements B2 to B16 can correspond to elements in a second row of the same antenna array, the second row typically being adjacent to the first row. Boxes (e.g. 610) represent hybrid couplers, while circles (e.g. 615) represent phase shifters. "Y" junctions (e.g. 620) may be power splitters. Various phase shifts are given in multiples of gyp, which can be approximately −11.25°. The phase shifts α2 to α16 and β2 to β16 are given in FIG. 6b.

FIG. 7a illustrates a 8×16 orthogonal analog beamformer network for an embodiment of phased array B. The structure and phase shifts are similar to FIG. 6a. The phase shifts α2 to α16 and β2 to β16 are given in FIG. 7b.

The beamformer networks of FIGS. 6a and 7a (with attendant phase shifts as in FIGS. 6b and 7b) are implemented with a 7 dB amplitude taper, although this can be varied in other embodiments. The beamformer networks of FIGS. 6a and 7a (with attendant phase shifts as in FIGS. 6b and 7b) are simplified when compared to a conventional Butler beamformer network (or a pair of Butler beamformer networks coupled together using a row of hybrids). For example, each of the beamformer networks of FIGS. 6a and 7a require 12 hybrid couplers each (24 total), whereas a 16-beam Butler beamformer network would require interleaving of 4×8=32 hybrid couplers total. Thus, a reduction of at least 8 hybrid couplers is realized. Reduction in complexity and number of components also provides for an associated reduction in losses. Furthermore, use of the two beamformer networks of FIGS. 6a and 7a to produce interleaved patterns of beams (e.g. in the azimuthal direction) results in beams which are orthogonal and also have low correlation due to low sidelobes. Such a situation is not readily achieved using a conventional Butler beamformer network.

The beamformer networks of FIGS. 6a and 7a can be used as beamformer networks in a given beamformer array. Each beamformer network is coupled to two different, typically adjacent, rows of antennas. The antennas in this case have an inter-element spacing of less than or equal to half of an operating wavelength. The beamformer networks can include or be used with hybrids to produce bi-sector beams (e.g. front and back beams in the elevation direction), similarly to those in FIG. 1a. The beamformer networks of FIGS. 6a and 7a can be used with antenna arrays having an inter-element spacing of less than or equal to half an operating wavelength.

For example, two adjacent beamformer networks of FIG. 6a or 7a can be connected to a row of hybrid couplers, similarly to the arrangement of FIG. 1a. In this case, the array element spacing may be required to be less than or equal to one quarter of an operating wavelength. As a result, the effective spacing between adjacent beamformer networks remains less than or equal to half-wavelength. Consequently, in some embodiments, only N/4 hybrids are required for the bi-sector array beamforming. Note that only N/2 Azimuth beamformers may be needed in some embodiments.

Accordingly, in some embodiments, as shown for example in FIG. 1a, each of a pair of rows of antenna elements is connected to a different one of two respective beamformer networks, and the two beamformer networks are interconnected using a row of hybrid couplers. In other embodiments, as shown for example in FIGS. 6a and 7a, each of a pair of rows of antenna elements is connected to a single interconnected beamformer network which is used to operate both rows of antenna elements. In both cases, two rows of antenna elements are cooperatively controlled for beamforming. The two different sets of antenna elements, which are coupled to a pair of interconnected beamformer networks or a single interconnected beamformer network, may be two different rows of antenna elements. These rows can be rows of a same corresponding antenna array. These rows can extend parallel to one another in one direction (e.g. azimuthal direction) and be spaced apart in another direction (e.g. elevation direction).

All of the embodiments as illustrated in FIGS. 1a, 6a and 7a can be described as follows. Each beamformer array includes a plurality of beamformer networks arranged in parallel. In the case of FIG. 1a each beamformer network is coupled to a single row of antenna elements, and pairs of beamformer networks are connected together using rows of hybrid couplers. In the case of FIGS. 6a and 7a each beamformer network is coupled to a pair of rows of antenna elements. The beamformer array in each case is configured to provide a set of beam ports. Each of the beam ports is operatively coupled, via one of the beamformer networks or via a coupled pair of the beamformer networks, to a pair of adjacent rows of the antenna elements. In the case of FIG. 1a the beam ports are ports of the hybrid couplers which face away from the antenna array. In the case of FIGS. 6a and 7a the beam ports are directly integrated into the beamformer networks.

In more detail, in the case of FIG. 1a, each of the beamformer networks is coupled to a different respective row of antenna elements, and each beamformer array includes one or more rows of hybrid couplers. Each row of hybrid couplers is connected to a respective pair of the beamformer networks, and, as mentioned above, the nominal beam ports of the array are ports of the hybrid couplers. In further embodiments, different hybrid couplers operate beams in different ones of the groupings of beams, and each hybrid coupler has a pair of ports. As described elsewhere herein, each one of the pair of ports operates a different bi-sector beam in a same one of the groupings of beams.

In more detail, in the case of FIGS. 6a and 7a, each of the beamformer networks is coupled to a different respective pair of adjacent rows of antenna elements. Each beamformer network includes a subset of the set of beam ports, where the number of beam ports in the subset is less than the number of antenna elements in said pair of adjacent rows. For example, in FIGS. 6a and 7a, there are up to 8 beam ports (e.g. 1L, 2L, 8R), while there are 30 (or 32) antenna elements. In fact, the number of beam ports is less than (e.g. approximately half) the number of antenna elements in a single row.

In yet more detail, in the case of FIGS. 6a and 7a, each of the beamformer networks can be characterized as follows. Each of the beamformer networks includes a plurality of hybrid couplers arranged in a series-parallel configuration. In the illustrated example, there are three rows of four hybrids each, with phase shifters between rows of hybrids. Each of the beamformer networks includes a plurality of power splitters each coupled to a pair of antenna elements, including one antenna element from each pair of rows. That is, each power splitter is coupled to a pair of antenna elements, one antenna element from each row. The topmost row of hybrid couplers is connected to the antenna elements via the power splitters. The beamformer network also includes a plurality of phase shifters. At least some of the phase shifters are disposed between the power splitters and the antenna elements. The phase shifters have different phase settings. There can be multiple cascaded sets of power splitters, and there can be phase shifters coupled between the hybrid couplers and the power splitters, and between different cascaded sets of power splitters.

In embodiments, for example corresponding to implementing the beamforming networks of FIGS. 6a to 7b, 12 out of 16 orthogonal, low BCF beams can be produced from a combined operation of Array A and Array B. This may provide for an azimuthal coverage of up to ±40 deg. The beams can produce low sidelobes (lesser than −15 dB) with low beam crossings at >10 dB. This can result in a significantly low BCF for each phased array set. In such a beamforming network (BFN), a total of only 24 hybrids for the two arrays is required, instead of 32 hybrids each for a conventional 16×16 BFN. Furthermore, only 15 radiating elements, instead of typical 16, are required, due to the arrays having an effective amplitude taper.

Figure 8A:
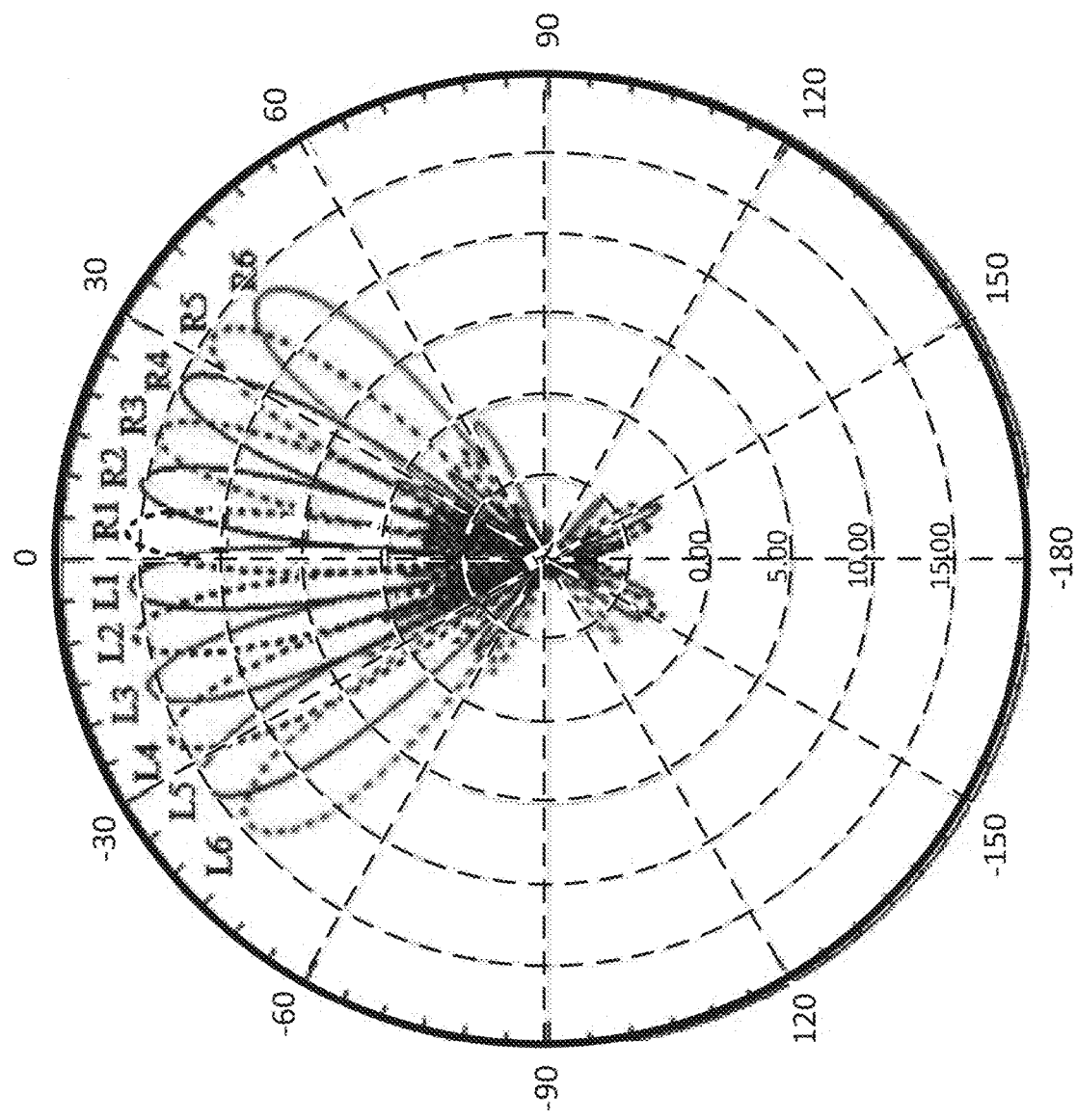
FIG. 8a is a graph showing 12 out of 16 orthogonal beams having a low beam coupling factor, for a phased array combining phased array A and phased array B (A+B), for an coverage of up to ±40 degree along the azimuthal axis Az, according to an embodiment.

FIG. 8a is a graph showing 12 out of 16 orthogonal, low-BCF beams of a phased array combining phased array A and phased array B (A+B), for coverage of up to ±40 degree along an azimuthal (Az) axis, according to an embodiment. The solid lines represent beams of phased array A, for example with beam R2 being accessible at port 2R of FIG. 6a, etc. The dashed lines represent beams of phased array B, for example with beam R1 being accessible at port 1R of FIG. 7a, etc.

In embodiments, each one of Array A and Array B can require two rows of identical arrays having different phase distributions in the final stage of a beam forming network (BFN). This is shown in both FIG. 6a and FIG. 7a. Because of effective amplitude and phase tapers (e.g. as in FIGS. 8b and 8c), such array architectures can produce orthogonal beams having low side lobes.

FIG. 8b is a table showing effective excitation amplitude and phase tapers for an 8×16 beamforming network, according to an embodiment, where beams are labeled L1-L6, and correspond to beams in FIG. 8a. The magnitudes and phases for various antenna combinations (shown as in FIGS. 6a, 7a) are shown for the various beams.

FIG. 8c is a table showing effective excitation amplitude and phase tapers for a 8×16 beamforming network, according to an embodiment, where beams are labelled R1-R6, and correspond to other beams in FIG. 8a. The magnitudes and phases for various antenna combinations (shown as in FIGS. 6a, 7a) are shown for the various beams.

Having described various aspects of the analog beamforming arrays and antenna arrays, active (e.g. digital) beamforming and channel state information estimation techniques, according to embodiments of the present invention, will be described below.

In embodiments, the analog (e.g. 8×16) BFNs can effectively split the azimuth coverage space into multiple orthogonal beam spaces with high-gain groupings of beams. The directions of these beams can be fixed, and they can be chosen to be orthogonal to the flight direction of a satellite to which the apparatus is mounted. Therefore, target devices can be allocated based on beam locations in the azimuth direction. However, target devices for each beam can be tracked along a flight path using digital beamforming techniques.

Channel estimation in a massive MIMO system can be achieved by estimating a channel transfer function using the available channel state information (CSI). However, because of long propagation delays (for example between target devices and satellites), which can typically be a few milliseconds, and because of the high mobility rate of satellites and target devices, obtaining instantaneous CSI at the transmitter side of a satellite system is not feasible. In embodiments, channel estimation can be conducted based on parametric channel models by using the direction-of-arrival (DOA) of signals. By mostly line-of-sight transmission, which can be assumed in many cases, the relative excitation phases of radiators in a 2D phased array can be approximated once the DOA of the incident signal is determined. In embodiments, this approach can be based on determination of the response vectors of the phased array. In embodiments, simple linear precoding processing can be derived for a 2D massive MIMO, based on a general array configuration.

Figure 9:
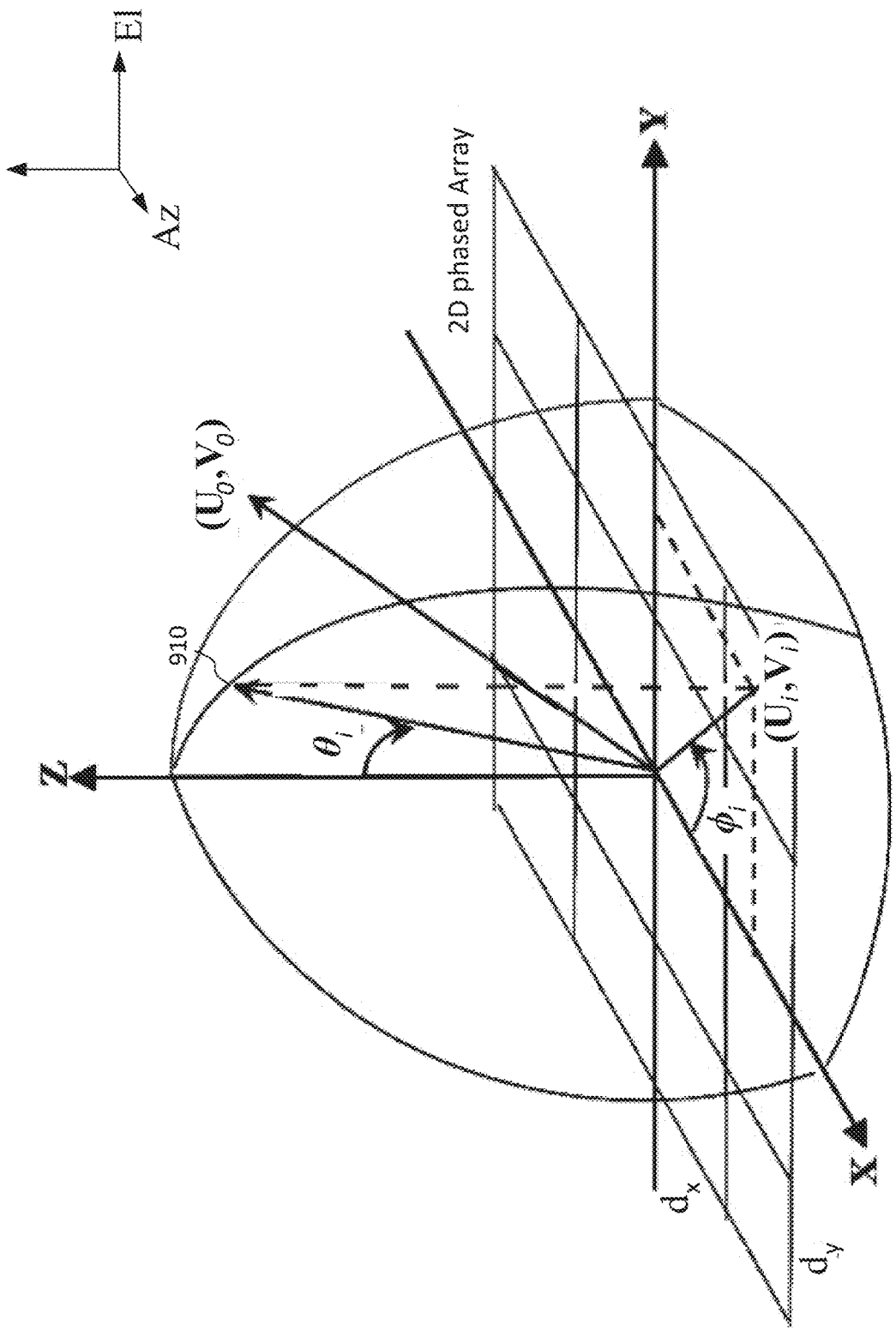
FIG. 9 illustrates a general coordinate system for a 2D massive MIMO phased array, according to an embodiment.

FIG. 9 illustrates a general coordinate system for a 2D massive MIMO phased array, according to an embodiment. An X-Y-Z coordinate system is shown, where the X axis can extend for example in the azimuthal direction of an antenna array and the Y axis can extend for example in the elevation direction of the antenna array. The two-dimensional antenna array is disposed in the X-Y plane, a reference antenna pointing angle is shown in the ($U_o$, $V_o$) direction, and a direction 910 of a target device i is shown having a component, when projected onto the X-Y plane, of ($U_i$, $V_i$). Angles $\theta_i$ and $\theta_i$ refer to the direction 910 of the target device i using spherical coordinates.

For line-of-sight (LOS) transmission, signals received by a satellite's 2D phased array antennas from a number P of target devices on the ground, can be expressed as:

$$Y(t) = \sum_{i=1}^{P} \beta_i(t) \cdot F(\theta_i, \Phi_i, t) \cdot R(t - \tau_i) + N(t)$$

Where:
$\beta_i(t)$ is the channel gain for target device i,
$F(\theta_i, \phi_i, t)$ is the array factor in time, of the satellite's phased array,
$R(t-\tau_i)$ is the transmission signal from target device i with delay $\tau_i$ and
$N(t)$ is noise, for example additive white Gaussian (AWGN) noise.
The frequency response corresponding to Y(t) is:

$$Y(f) = \sum_{i=1}^{P} \beta_i \cdot F(\theta_i, \Phi_i) \cdot R(\varphi_i) + W$$

Where:
$\beta_i$ is the complex channel gain,
$F(\theta_i, \phi_i)$ is the complex 2D array factor,
$R(\varphi_i)$ is the transmitted signal with phase delay $\varphi_i$ and
W is the AWGN noise.
Based on FIG. 9, a general form for the array factor of a uniform 2D phased array can be expressed as:

$$F(\theta_i, \Phi_i) = \left[\sum_m \exp[jk_0 m d_x (u_i - u_0)]\right]\left[\sum_n \exp[jk_0 n d_y (v_i - v_0)]\right]$$

where:
x and y are the 2D array axes,
$k_0$ is the propagation constant
m is the number of array element
$d_x$ and $d_y$ are the element spacing in x and y direction
u and v are the scanning axes,
($u_0$, $v_0$) is the reference antenna's pointing angle and
($u_i$, $v_i$) is the target device i location given by:

$u_i = \cos(\theta_i)\sin(\theta_i)$ $v_i = \sin(\theta_i)\sin(\theta_i)$

By performing analog beamforming in the u scanning axis direction, one can obtain a set of orthogonal beams with the following general (1/x)sin(x) beam pattern (beam space in the u direction):

$$\text{Analog } BF\left[\sum_m \exp[jk_0 d_x (u_i - u_0)]\right] =$$

$$\sum_m f_m(u_i) = \sum_m \frac{\sin\left[N\pi\left(\frac{u_i d_x}{\lambda} - \frac{m}{N}\right)\right]}{N\sin\left[\pi\left(\frac{u_i d_x}{\lambda} - \frac{m}{N}\right)\right]}$$

The above equation can represent a set of N orthogonal beams in the u direction, where the value for each beam depends only on the location of target device i and beam number m. Consequently, the signal received by a 2D phased array can be expressed as:

$$Y(f) = \sum_{i=1}^{P} \beta_i \cdot \sum_m f_m(u_i) \cdot \sum_n \exp[jk_0 n d_y (v_i - v_0)] \cdot R(\varphi_i) + W$$

Because the N beams in the u scanning axis direction are orthogonal and have low beam coupling, they can be treated as a spatially separated sector. Therefore, the total received signal can be treated separately in each beam space m:

$$Y(f) = \sum_{m=1}^{N} Y_m(f)$$

$$Y_m(f) = f_m(u_i)\sum_{i=1}^{P}\sum_n \beta_i^n \cdot \exp[jk_0 n d_y (v_i - v_0)] \cdot R_i^n + W$$

In embodiments where a satellite is moving at a constant high speed of $v_{sat}$, and terminals are moving at a relatively much slower speed, a Doppler shift can be included in the formulation as a phase shift factor $e^{j\omega_i}$, with a Doppler radian angle defined as:

$$\omega_i = e^{j\frac{2\pi}{\lambda}v_{sat}\sin(v_i)}$$

Each beam signal received then becomes:

$$Y_m(t) = f_m(u_i)\sum_{i=1}^{P}\sum_n \exp[jk_0 n d_y (v_i - v_0)] \cdot \beta_i^n \cdot e^{j\omega_i} \cdot R_i^n + W$$

A beam steering vector can be defined as:

$$A_i^n = (1, \exp[jk_0 d_y (v_i - v_0)], \ldots \ldots \ldots [jk_0(N-1)d_y(v_i - v_0)])$$

$$Y_m(t) = f_m(u_i) \cdot \sum_{i=1}^{P}\sum_n A_i^n \cdot S_i^n(t) + W$$

$$Y_m(t) = f_m(u_i) \cdot \sum_{i=1}^{P}\{A \cdot S(t)\}_n + W$$

Here, $\{A \cdot S(t)\}_n$ is an n-dimension linear precoder, which can easily be performed using one of a variety of processing methods including digital Fourier transform (DFT), multiple signal classification (MUSIC), and the estimation signal parameter via a rotational invariant technique (ESPRIT). Accordingly, for each target device i, a complex massive-MIMO processing can be reduced to a linear precoding of n dimensions.

According to the above, a channel state estimator may be provided in the apparatus disclosed herein. The channel state estimator is configured to estimate the state of a (primarily line-of-sight) wireless communication channel between the apparatus and a remote wireless communication device. This estimate may be based on a direction of arrival of a signal (e.g. a pilot signal) transmitted by the remote wireless communication device, and further based on a geometry of the first antenna array and the second antenna array. This estimate may be obtained using statistical channel state information and a parametric channel model. Estimation may be performed as described above with respect to FIG. 9 and the disclosed equations.

The channel state estimation can be described as using statistical channel state information, for example using a parametric model. In this approach, two-dimensional pilot signal processing (as would be required for a conventional two-dimensional antenna array) is replaced with multiple linear processing operations. The processing operations are based on the direction of arrival of (e.g. pilot) signals in a computation which is configured based on a geometry of the array (as represented by the array factor). The direction of arrival is for one direction, e.g. the elevation direction. This leads to increased speed and lower simplicity. Because the pilot signals are received through beams rather than at the single antenna element level, the signal strength of the pilot signals is significantly increased compared to conventional methods. Because there are multiple separate groupings of beams which are substantially decoupled, the processing is simplified into a set of one-dimensional, linear processing operations. In particular, the pilot signal processing is reduced to N parallel, linear precoding operations using statistical CSI.

In some embodiments, estimating the wireless communication channel state comprises performing a plurality of separate linear precoding operations, as described above.

Also according to the above, an active (e.g. digital) beamformer can be provided which is coupled to one, two or multiple beamforming arrays. The active beamformer may be configured to generate, using digital precoding, one or more tracking beams at least in part by combining multiple beams belonging to one of the groupings of beams, of the multiple spaced-apart groupings of beams, which is produced by the antenna array or arrays in combination with the beamforming array or arrays. The active beamformer can combine, using different phasing, beams of a given grouping of beams, or set of overlapping groupings of beams, to produce steerable beams.

Because the groupings of beams can have a narrow cross section and be elongated in a first (e.g. elevation) direction, beam steering can be substantially one-dimensional, i.e. steering in the first direction. This may simplify operation. Accordingly, in various embodiments, each grouping of beams (of the beamformer arrays and antenna arrays) is composed of individual beams which collectively have a respective combined cross section which is elongated in a first direction. Then, the tracking beams of the active beamformer are steerable in the first direction.

Figure 10:
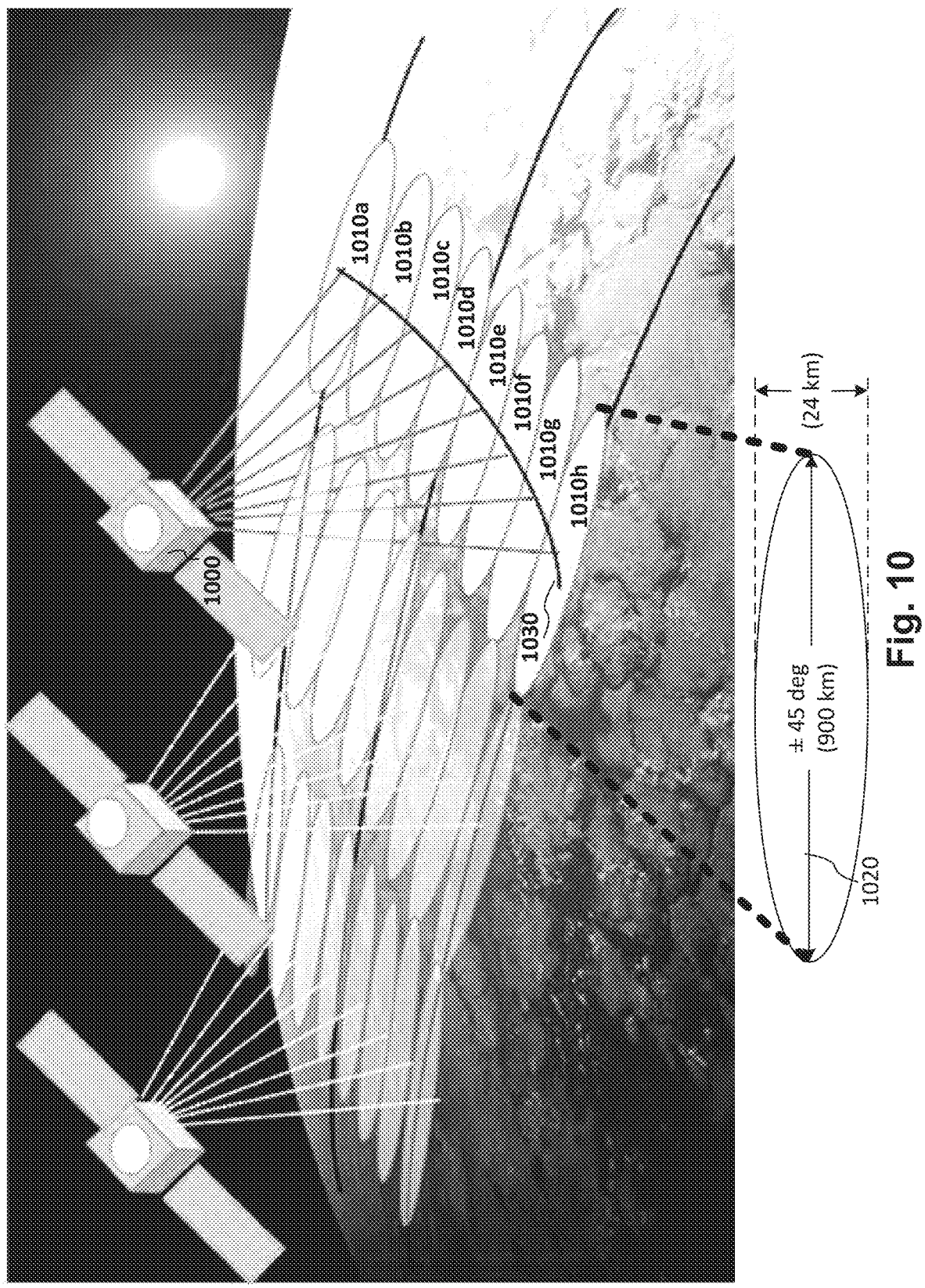
FIG. 10 is a conceptual drawing of a low-orbit VHTS massive-MIMO passed array, according to an embodiment.

FIG. 10 depicts a conceptual view of a low-orbit VHTS massive-MIMO phased array on board a satellite 1000 shown in three different positions, according to an embodiment. The satellite can produce multiple orthogonal elliptical high-gain beams (or groupings of beams) 1010a, 1010b, 1010c, 1010d, 1010e, 1010f, 1010g, 1010h in the azimuthal direction 1030. This is shown in more detail in FIG. 11. Beams 1010a, 1010c, 1010e, 1010g can be produced by one array or set of arrays and beams 1010b, 1010d, 1010f, 1010h can be produced by another array or set of arrays. A target device on the ground can then be tracked by the satellite using massive-MIMO processing during each pass. As illustrated by way of example, the beam (or beam grouping) cross sections at Earth intersection may be, for example, 900 km long (corresponding to elevation direction 1020) and 24 km wide (corresponding to azimuthal direction). Thus, the beams or beam groupings are such that this cross section significantly longer (e.g. at least ten times longer in some embodiments, and 30 to 50 times longer in some further embodiments) than it is wide.

In an embodiment, a phased array can be arranged to have a dual-panel orthogonal beam-space massive-MIMO. A set of two complementary array panels, array A and array B, can be used and they can produce alternating beams that are orthogonal to each other. Multiple sets of two such complementary array panels may be provided. To achieve a high data-rate through massive-MIMO processing, a total number of M pairs of panels can be used. Each array panel includes an antenna array and optionally a corresponding beamforming array. Alternatively, the beamforming arrays may separate from the panels, provided that sufficient coupling between beamforming arrays and antenna arrays can be performed.

FIG. 11 illustrates a dual-panel orthogonal beam-space massive-MIMO phased array, according to an embodiment. A brief explanation of FIG. 11 has been previously provided. However it is noted here that FIG. 11 illustrates an apparatus having a chassis 1100 and a first set of antenna and beamforming arrays A1, A2, A3, A4, . . . Am, and a second set of antenna and beamforming arrays B1, B2, B3, B4, . . . Bm. In general, m can be any number greater than or equal to one or two. Each of the first set of antenna and beamforming arrays is configured to produce a copy of the spaced-apart groupings of beams 1120 while each of the second set of antenna and beamforming arrays are configured to produce a copy of the spaced-apart groupings of beams 1130. Notably, the groupings of beams are elongated in a first direction and each typically includes multiple beams. Furthermore, the multiple copies of the groupings provide for multiple overlapping beams. All the overlapping beams corresponding to a given grouping can be operated together using the active beamformer, in order to create composite beams which are steerable in the first direction. Beamsteering in the second direction can be achieved by using different groupings of beams.

According to an example embodiment corresponding to FIG. 11, multiple (e.g. 16) elliptical beam groupings per satellite can be provided. Beamsteering or tracking can be performed along a major axis of each ellipse, Massive-MIMO (M-MIMO) operation can be performed, or both. Such a configuration can potentially improve handover complexity. In various embodiments, 8-16 parallel elliptical beams or beam groupings can be provided per satellite through beamfoming. 50 ports (800/satellite) per beam for HPBW=2 deg can be provided. M array panels per satellite can be used for M-MIMO or tracking processing to achieve effective beam with HPBW<1 deg (along track). This may incorporate a ultrawideband active phased arrays with over 5 GHz bandwidth, dual polarized, and wide scan angle>±45. Phased array with element spacing<$\lambda$/2 with good active impedance may be provided for a scan angle up to 45°.

A low-orbit satellite can typically be moving at a relatively high speed along a constant path, at a few hundreds to a thousand kilometers above the ground. For a user (target device) on the ground, a low-orbit satellite appears in view only for a short period of time (a few minutes) and can be moving at a constant speed along a predictable linear direction. As such, a satellite beam may be required to track a target device on the ground as it moves. This can require a wide-angle beam steering capability in the elevation direction. Because the view angle of a satellite is expected to be about ±40°, the array beam should be able to steer over ±45° angle. To achieve this goal using massive-MIMO precoding in elevation, each individual azimuth beam output may be required to have a coverage angle of ±45° and produce a pilot signal with sufficient strength to achieve a minimum SNR for massive-MIMO processing. The outputs of each orthogonal beam at a given azimuth angle can then be combined to form a typical steerable phased array beam. However, because of a wide beam angle in the elevation angle (±45°), this may not produce sufficient signal strength at each azimuth beamformer.

To improve the signal strength of a pilot signal, and to form two high-gain orthogonally steerable elevation beams, embodiments of the present invention make use of a 90° hybrid coupler (also referred to as a hybrid) at the output of each orthogonal azimuth beam. An embodiment including 90° hybrids is shown in FIG. 1a. Each 90° hybrid can effectively split the radiation pattern of a single element into two sectors: a front radiation sector and a back radiation sector.

Figure 12:
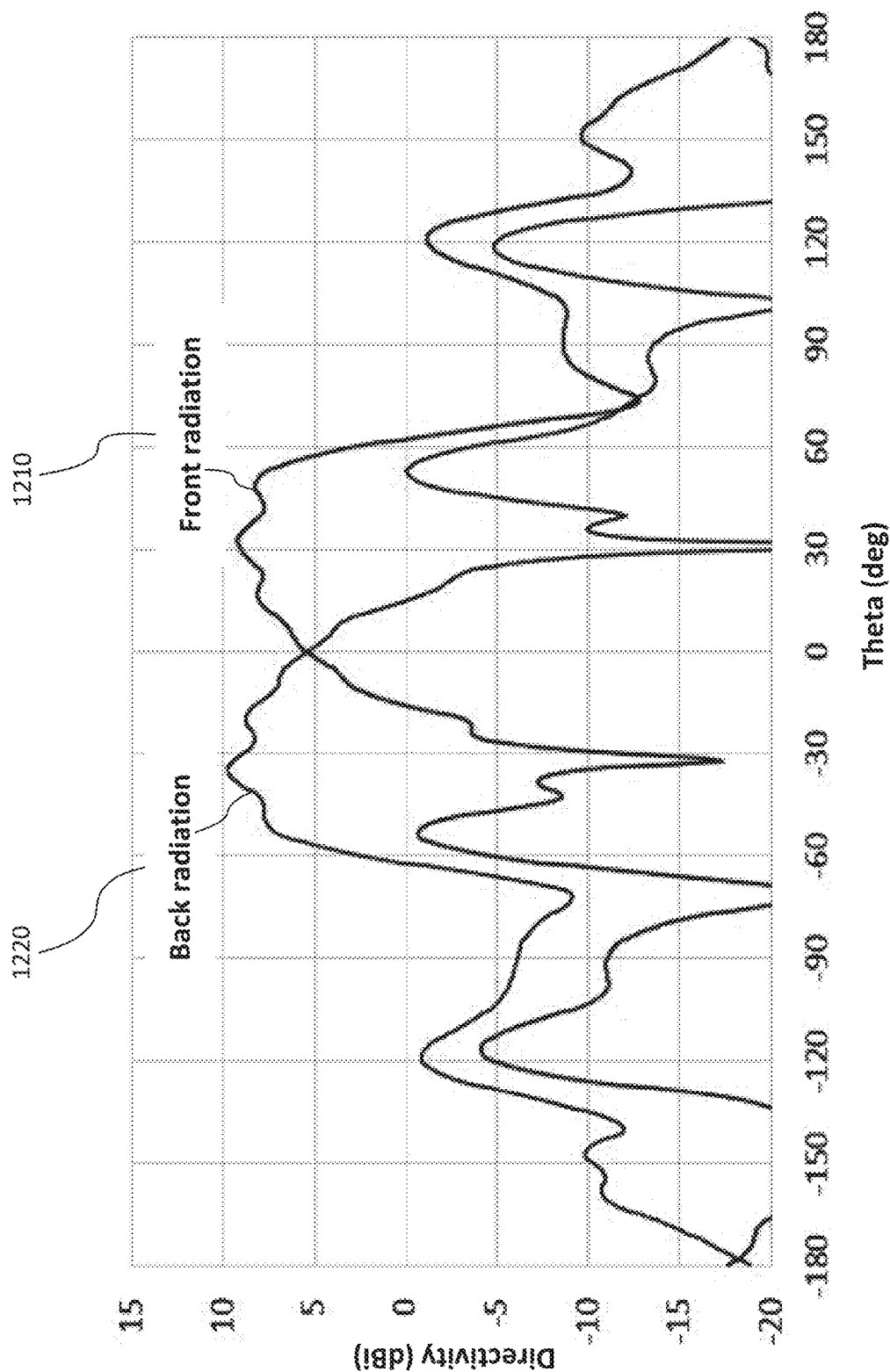
FIG. 12 is a graph showing a front radiation pattern and a back-radiation pattern, resulting from a 90° hybrid having effectively split the radiation pattern of a single element into bi-sector orthogonal beams.

FIG. 12 is a graph showing a front radiation pattern and a back-radiation pattern, resulting from a 90° hybrid having effectively split the radiation pattern of a single element into bi-sector orthogonal beams. The front radiation beam pattern 1210 and the back radiation beam 1220 are orthogonal to each other and they are steerable with a pre-tilt angle of approximately, or exactly, 30°, at the operating frequency at which the array spacing is exactly one half-wavelength. These two beam patterns can have an appropriate (e.g. just the right) half-power beam width (HPBW) to allow beam-steering to use array processing from 0° to 45°, with a minimum of 85% radiation efficiency. Because the coverage angle of each beam can be reduced to half, the overall gain of each steerable beam can be increased by a factor of 2 (3 dB).

Figure 13:
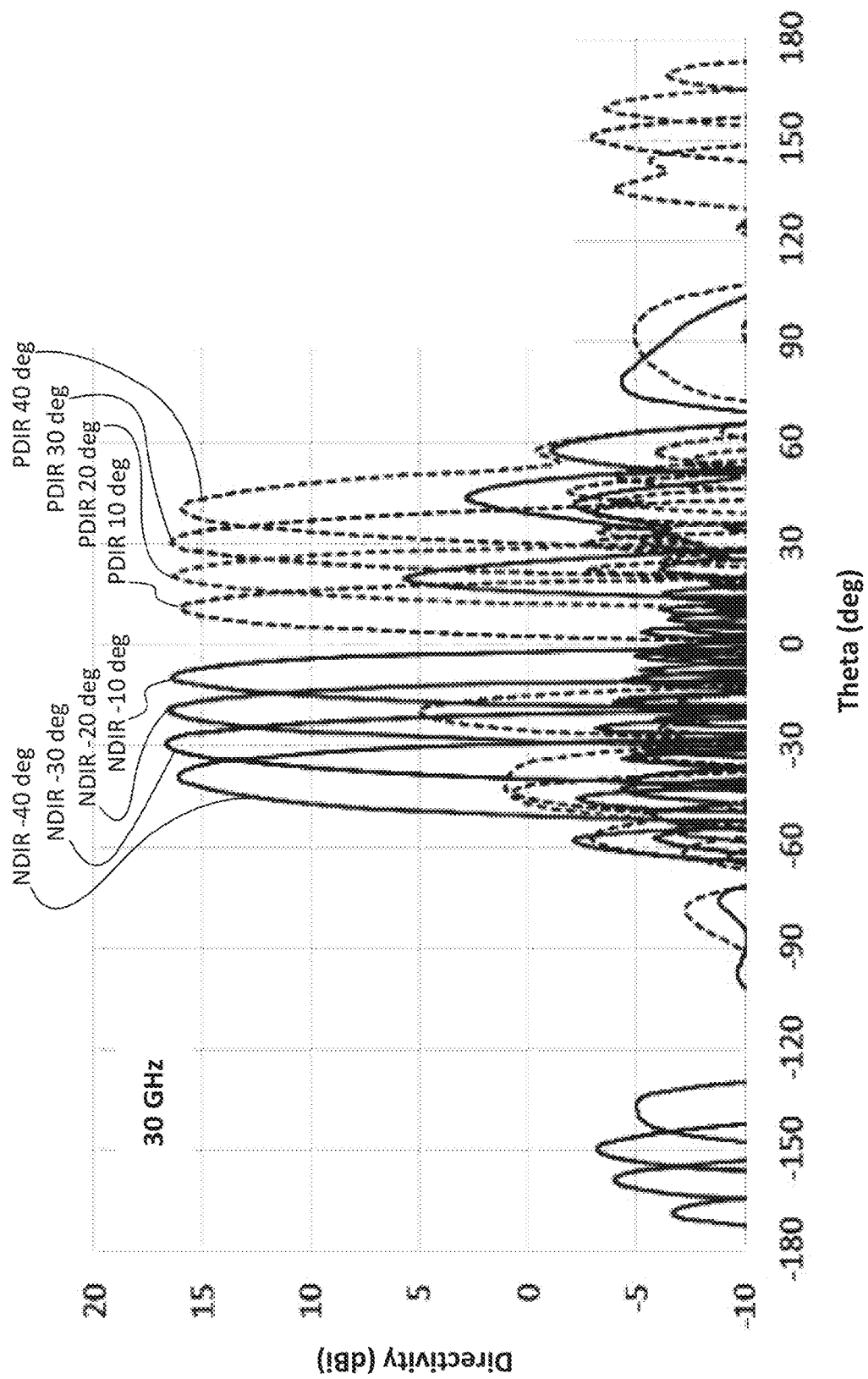
FIG. 13 is a graph showing array output patterns of bi-sector orthogonal steerable beams over a ±45° range in the elevation plane, except at angles near the 0° elevation, according to an embodiment.

FIG. 13 is a graph showing array output patterns of bi-sector orthogonal steerable beams over a ±45° range in the elevation plane, except at angles near the 0° elevation. The beams are bi-sector in that back beams (labelled NDIR) and front beams (labelled PDIR) are angularly separated.

Accordingly, when bi-sector front and back beams are employed, each beam can be used on its own (or with other front or back beams respectively) to perform beamsteering toward a front or back portion of a given area, for example toward one end of an ellipse of FIG. 11. Front and back beams can be combined to perform beamsteering toward a central portion of a given area, for example toward a center of an ellipse of FIG. 11.

Figure 14:
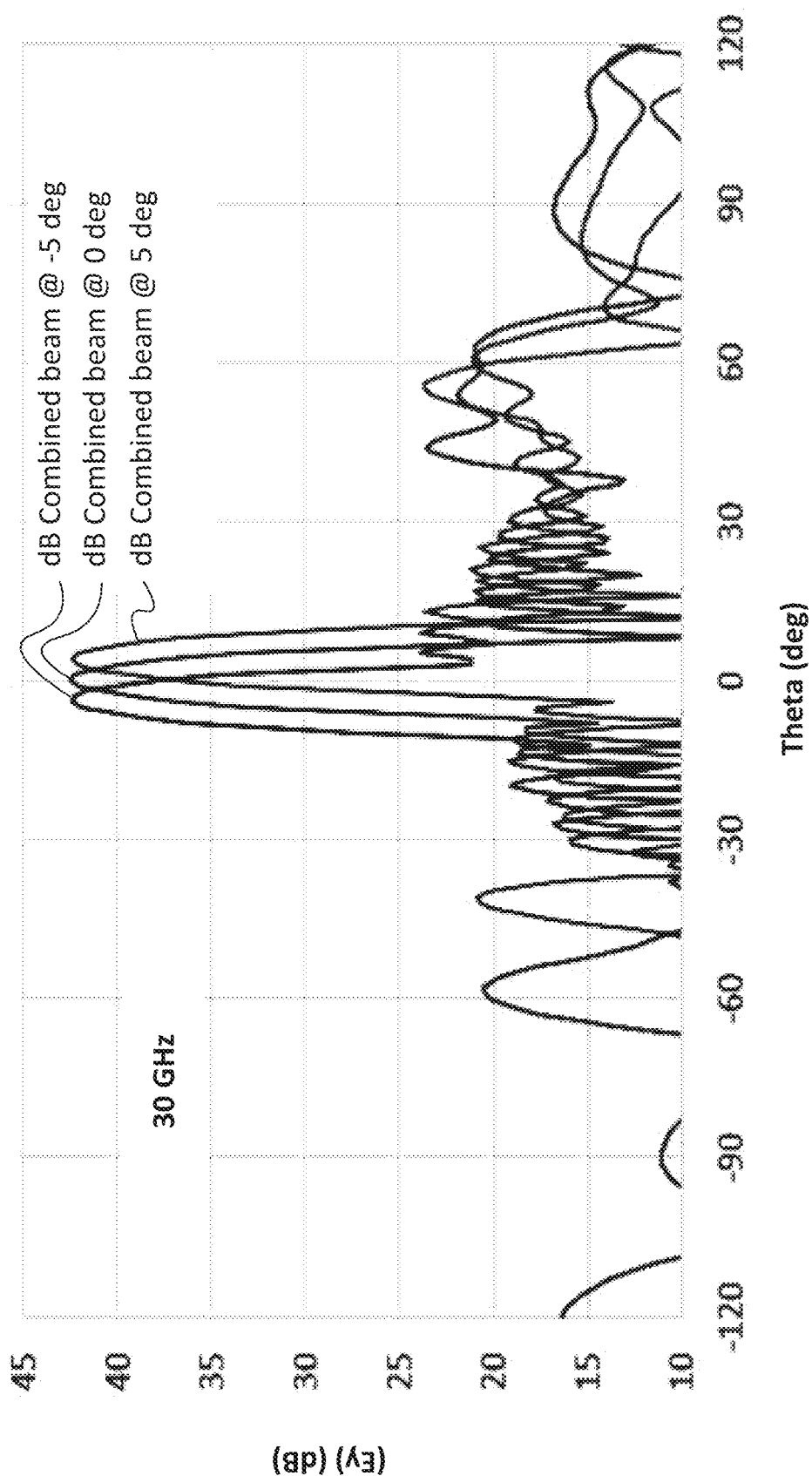
FIG. 14 is a graph showing a combined pattern for two bi-sector steerable beams near a 0o elevation, according to an embodiment where a low-orbit satellite is operating at 30 GHz at an altitude of 350 km.

FIG. 14 is a graph showing a combined pattern for two bi-sector steerable beams near 0° elevation, according to an embodiment where a low-orbit satellite is operating at 30 GHz at an altitude of 350 km. At a low elevation angle (less than one HPBW), the two beams can overlap. As a result, the radiation efficiency of each beam can be reduced due to the high coupling. Although the two beams can have a high beam coupling near 0° elevation, they can be excited individually without coupling losses, because the two beams remain orthogonal. Combining the two beams can result in a substantially complete recovery of the efficiency losses in each individual beam.

In an embodiment, a m-MIMO performance can be achievable with a pilot signal using two array panels of 320 mm sq.

FIG. 15a is a table showing actual m-MIMO performance data for a pilot signal using two array panels of 320 mm sq.

Performance can then be significantly improved using m-MIMO processing with a significantly wider bandwidth and a higher number of array panels.

FIG. 15b is a table showing actual m-MIMO performance data for a pilot signal using 2 array panels of 320 mm sq., where m-MIMO processing has a wider bandwidth and a higher number of array panels, five pairs of panels.

In view of the above, a long-distance wireless communication apparatus is provided that can be adapted for use in satellite systems. For example, the apparatus can be used to provide a VLEO satellite-based massive-MIMO array for direct handset-satellite link, for example using Ku/Ka/V/Q-band transmission. For very low altitude satellite constellation at altitude of 350 km, embodiments of the present invention may be employed to provide a direct link between handset devices with satellite using beam-space massive-MIMO, for example with a BER=1e-05.

In various embodiments, pilot signals from target devices may be employed which use low modulation code such as BPSK/QPSK while data communications can exploit higher order modulation. A parametric channel estimation method has been developed herein based on DOA for fast linear precoding.

Embodiments of the present invention provide for a multi-beam M-MIMO apparatus which potentially reduces antenna and beamforming array complexity and potentially provides flexibility in improving overall performance.

Embodiments of the present invention can potentially employed in a communication system providing a total throughput of over 30 Gbps/satellite/beam, using massive-MIMO phased arrays with sizes in the order of 1.6×0.64 m and available spectrum bandwidth of 5 GHz, transmit power 200 mW/panel.

In some cases, unlike a conventional spot-beam m-MIMO phased array, embodiments of the present invention use parametric channel estimation for fast signal processing. An expedient method of linear precoding for the parametric channel estimation based on users DOA is disclosed herein. This channel estimation method is applicable to both TDD and FDD transmission.

In some cases, compared to a conventional massive-MIMO system, embodiments of the present invention provide for significantly improved pilot signal strength which improve quality of service and enables longer service distance. Pilots are monitored on a per-beam basis rather than per antenna element.

In some embodiments related to low-orbit satellite applications, if the beam steering direction of the array (e.g. elevation direction) is set to be the same as the orbiting direction of the satellite, then beam tracking for a given user is reduced to a simple linear one-dimensional precoding processing once the appropriate azimuth beam is selected. Compared to a full two-dimensional spot-beam phased array, this allows for significantly simpler and higher energy-efficient multi-user operations.

Embodiments of the present invention are readily scalable. Capacity of the system can be increased by adding more array panels without significantly increase complexity and processing time. Adding panels increases the degrees of freedom available for beamforming using the active beamformer and M-MIMO processing at least in one (e.g. elevation) direction. This can facilitate narrower beamwidth, higher gain, or both, with beamwidth being reduced in proportion to the number of panels used. In one embodiment, the HPBW can be approximately 0.2° in the direction of elongation of the groupings (e.g. elevation direction).

While the present invention described beams as being produced, it should be noted that beams can be implemented for use in transmission, reception, or both, via the principle of antenna reciprocity.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A wireless communication apparatus comprising:
a first two-dimensional antenna array comprising multiple antenna elements;
a second two-dimensional antenna array, the second antenna array comprising multiple additional antenna elements and being separate from the first antenna array;
a first beamformer array operatively coupled to the first antenna array and configured to produce a first plurality of beams by operating the first antenna array as a phased array, the first plurality of beams being separated into multiple spaced-apart groupings of beams; and
a second beamformer array operatively coupled to the second antenna array and configured to produce a second plurality of beams by operating the second antenna array as a second phased array, the second plurality of beams separated into a multiple additional spaced-apart groupings of beams which are interleaved with said multiple spaced-apart groupings of beams,
wherein each grouping of beams comprises a respective plurality of overlapping beams; and
wherein each beamformer array comprises a plurality of beamformer networks arranged in parallel, and wherein the beamformer array is configured to provide a set of beam ports, each of the beam ports operatively coupled, via one of the beamformer networks or via a coupled pair of the beamformer networks, to a pair of adjacent rows of said antenna elements.

2. The apparatus of claim 1, wherein each of the beamformer networks is coupled to a different respective row of antenna elements and each beamformer array further comprises one or more rows of hybrid couplers, each row of hybrid couplers being connected to a respective pair of the plurality of beamformer networks, and wherein said beam ports are ports of the hybrid couplers.

3. The apparatus of claim 2, wherein different hybrid couplers operate beams in different ones of the groupings of beams and wherein each hybrid coupler comprises a pair of ports, each one of the pair of ports operating different bi-sector beams in a same one of the groupings of beams.

4. The apparatus of claim 1, wherein each of the beamformer networks is coupled to a different respective pair of adjacent rows of said antenna elements and comprises a subset of the set of beam ports, a number of beam ports in said subset being less than a number of antenna elements in said pair of adjacent rows.

5. The apparatus of claim 4, wherein each of the beamformer networks comprises a plurality of hybrid couplers arranged in a series-parallel configuration, a plurality of power splitters each coupled to a pair of antenna elements comprising one antenna element in each of said pair of adjacent rows, and a plurality of phase shifters, at least some of the phase shifters disposed between said power splitters and said antenna elements.

6. The apparatus of claim 1, wherein the multiple antenna elements and the multiple additional elements, respectively, are arranged with an inter-element spacing of less than or equal to half an operating wavelength.

7. The apparatus of claim 1, wherein each grouping of beams is composed of individual beams which collectively have a respective combined cross section which is elongated in a first direction, and wherein the different groupings of beams are aligned alongside one another in a second direction which is perpendicular to the first direction.

8. The apparatus of claim 7, wherein the apparatus is carried on a satellite which moves relative to Earth, and wherein the first direction is oriented so that each respective combined cross section is a portion of Earth's surface which is elongated parallel to a direction of travel of the satellite.

9. The apparatus of claim 7, wherein each grouping of beams is a bi-sector grouping of beams comprising one, two or more front beams which collectively provide a first part of said combined cross section, said first part being toward a first end of the combined cross section, and wherein each grouping of beams further comprises one, two or more back beams which collectively provide a second part of said combined cross section, said second part being toward a second end of the combined cross section, the first end and the second end being opposite one another along the first direction, the first part and the second part being overlapping or non-overlapping.

10. The apparatus of claim 9, wherein said front beams are orthogonal to said back beams and wherein said front beams are directed at a different angle relative to said back beams.

11. The apparatus of claim 1, further comprising an active beamformer operatively coupled to the first beamformer array, the active beamformer configured to generate, using digital precoding, one or more tracking beams at least in part by combining multiple beams, belonging to one of the groupings of beams, of the multiple spaced-apart groupings of beams.

12. The apparatus of claim 11, wherein each grouping of beams is composed of individual beams which collectively have a respective combined cross section which is elongated in a first direction, and wherein the active beamformer is configured to steer the tracking beams in the first direction.

13. The apparatus of claim 11, further comprising:
one or more additional antenna arrays and one or more additional beamformer arrays each operatively coupled to a respective one of the additional antenna arrays, each of the additional beamformer arrays configured to produce additional copies of the first plurality of beams by operating the respective one of the additional antenna arrays as a further phased array, each of said additional copies overlapping with the first plurality of beams,
wherein the active beamformer is further operatively coupled to each of the additional beamformer arrays, and wherein the active beamformer is configured to generate said one or more tracking beams further by combining said multiple beams with one or more additional beams belonging to said additional copies of the first plurality of beams.

14. The apparatus of claim 1, wherein each grouping of beams is composed of individual beams which collectively have a respective combined cross section which is elongated in a first direction, wherein the different groupings of beams are aligned alongside one another in a second direction which is perpendicular to the first direction, and wherein said rows of antenna elements extend parallel to one another in the second direction and are spaced apart from one another in the first direction.

15. The apparatus of claim 1, further comprising a channel state estimator configured to estimate a primarily line-of-sight wireless communication channel state between the apparatus and a remote wireless communication device based on a direction of arrival of a signal transmitted by the remote wireless communication device, and further based on a geometry of the first antenna array and the second antenna array, using statistical channel state information and a parametric channel model.

16. The apparatus of claim 15, wherein said groupings of beams are orthogonal to one another, and wherein estimating the wireless communication channel state comprises performing a plurality of separate linear precoding operations.

17. The apparatus of claim 1, wherein the first beamformer array and the second beamformer array are fixed analog beamformer arrays.

18. A method for wireless communication, comprising:
  operating a first two-dimensional antenna array comprising multiple antenna elements arranged with an inter-element spacing of less than or equal to half an operating wavelength;
  operating a second two-dimensional antenna array, the second antenna array comprising multiple additional antenna elements arranged with an inter-element spacing of less than or equal to half an operating wavelength and being separate from the first antenna array;
  operating a first beamformer array operatively coupled to the first antenna array and configured to produce a first plurality of beams by operating the first antenna array as a phased array, the first plurality of beams being separated into multiple spaced-apart groupings of beams; and
  operating a second beamformer array operatively coupled to the second antenna array and configured to produce a second plurality of beams by operating the second antenna array as a second phased array, the second plurality of beams separated into a multiple additional spaced-apart groupings of beams which are interleaved with said multiple spaced-apart groupings of beams,
  wherein each grouping of beams comprises a respective plurality of overlapping beams; and
  wherein each beamformer array comprises a plurality of beamformer networks arranged in parallel, and wherein the beamformer array is configured to provide a set of beam ports, each of the beam ports operatively coupled, via one of the beamformer networks or via a coupled pair of the beamformer networks, to a pair of adjacent rows of said antenna elements.

* * * * *

UNITED STATES PATENT AND TRADEMARK OFFICE
CERTIFICATE OF CORRECTION

PATENT NO. : 11,245,442 B1
APPLICATION NO. : 17/195089
DATED : February 8, 2022
INVENTOR(S) : Senglee Foo and Wen Tong It is certified that error appears in the above-identified patent and that said Letters Patent is hereby corrected as shown below:

In the Claims

Column 13, Line 61, "Various phase shifts are given in multiples of gyp, which can" should read --Various phase shifts are given in multiples of $\varphi$, which can--;

Column 17, Line 55, "$v_i = Sin(\theta_i)Sin(\theta_i)$" should read --$v_i = Sin(\Phi_i)Sin(\theta_i)$--.

Signed and Sealed this
Ninth Day of April, 2024

Katherine Kelly Vidal
*Director of the United States Patent and Trademark Office*